(12) United States Patent
Li et al.

(10) Patent No.: US 12,379,553 B2
(45) Date of Patent: Aug. 5, 2025

(54) OPTICAL FIBER PLUG, OPTICAL FIBER CONNECTOR, AND OPTICAL FIBER CONNECTION SYSTEM

(71) Applicant: HUAWEI TECHNOLOGIES CO., LTD., Shenzhen (CN)

(72) Inventors: Xiupeng Li, Wuhan (CN); Shangjun Peng, Wuhan (CN); Yuanyuan Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 18/177,262

(22) Filed: Mar. 2, 2023

(65) Prior Publication Data

US 2023/0204873 A1 Jun. 29, 2023

Related U.S. Application Data

(63) Continuation of application No. PCT/CN2021/111905, filed on Aug. 10, 2021.

(30) Foreign Application Priority Data

Sep. 4, 2020 (CN) .......................... 202010923453.7

(51) Int. Cl.
*G02B 6/38* (2006.01)
(52) U.S. Cl.
CPC ......... *G02B 6/3891* (2013.01); *G02B 6/3825* (2013.01); *G02B 6/387* (2013.01)

(58) Field of Classification Search
CPC .......................... G02B 6/3891; G02B 6/3825
See application file for complete search history.

(56) References Cited

U.S. PATENT DOCUMENTS

| 4,872,736 A | * | 10/1989 | Myers ................. G02B 6/3893 |
| | | | 439/352 |
| 5,233,674 A | * | 8/1993 | Vladic .................. G02B 6/389 |
| | | | 385/88 |
| 9,595,788 B1 | * | 3/2017 | Luksic ............... H01R 13/6277 |
| 2016/0209599 A1 | | 7/2016 | Van Baelen et al. |

(Continued)

FOREIGN PATENT DOCUMENTS

| CN | 105339822 B | 10/2017 |
| CN | 110998397 A | 4/2020 |
| CN | 112099154 A | 12/2020 |

(Continued)

*Primary Examiner* — Rhonda S Peace
(74) *Attorney, Agent, or Firm* — Maier & Maier, PLLC

(57) ABSTRACT

An optical fiber plug includes a plug body, a locking structure, and an unlocking structure. The locking structure is located on a side wall of the plug body, and configured to, when the plug body is inserted into an optical fiber adapter in an insertion direction, match an elastic bolt of the optical fiber adapter, to lock a relative position between the plug body and the optical fiber adapter. The unlocking structure is located on the side wall of the plug body, and configured to, when the plug body is detached from the optical fiber adapter in a direction opposite to the insertion direction, release matching between the locking structure and the elastic bolt. By using the optical fiber plug, a problem related to complexity of mounting and removal is resolved and a space is for operation can be reduced.

18 Claims, 16 Drawing Sheets

(56) References Cited

U.S. PATENT DOCUMENTS

2018/0366861 A1* 12/2018 Gilbert ................. G02B 6/3878
2023/0204873 A1* 6/2023 Li ........................ G02B 6/3893
385/27

FOREIGN PATENT DOCUMENTS

| GB | 2261742 A | 5/1993 |
|----|-----------|--------|
| JP | H10319274 A | 12/1998 |
| JP | 2005266088 A | 9/2005 |

* cited by examiner

OPTICAL FIBER PLUG, OPTICAL FIBER CONNECTOR, AND OPTICAL FIBER CONNECTION SYSTEM

CROSS-REFERENCE TO RELATED APPLICATIONS

This application is a continuation of International Application No. PCT/CN2021/111905, filed on Aug. 10, 2021, which claims priority to Chinese Patent Application No. 202010923453.7, filed on Sep. 4, 2020. The disclosures of the aforementioned applications are hereby incorporated by reference in their entireties.

TECHNICAL FIELD

The embodiments relate to the field of optical communications technologies, an optical fiber plug, an optical fiber connector, and an optical fiber connection system.

BACKGROUND

During an operation of fiber to the home (FTTH), optical cables need to be routed through a central office (CO), a connectorized fiber distribution point (CFDP), and finally to a customer splicing point (CSP).

In a related technology, when an optical cable between the CFDP and the CSP is routed, an optical fiber plug at one end of the optical cable is inserted into and fastened to an optical fiber adapter of the CFDP, and an optical fiber plug at the other end of the optical cable is inserted into and fastened to the CSP. This implements optical cable routing between the CFDP and the CSP.

However, because the optical fiber plug and the optical fiber adapter are fastened to each other by mating a locking cap on the optical fiber plug with a locking member on the optical fiber adapter, after the optical fiber plug is inserted into the optical fiber adapter, the locking cap on the optical fiber plug further needs to be screwed to interlock the locking cap with the locking member together, so as to implement insertion and fastening between the optical fiber plug and the optical fiber adapter. Correspondingly, when the optical fiber plug is to be removed from the optical fiber adapter, the locking cap on the optical fiber plug needs to be unscrewed first, and then the optical fiber plug is pulled out from the optical fiber adapter. As a result, both mounting and removal between the optical fiber plug and the optical fiber adapter are complex, and a large space is required for operation.

SUMMARY

The embodiments may provide an optical fiber plug, an optical fiber connector, and an optical fiber connection system, to resolve a problem that mounting and removal of the optical fiber plug are complex and a large space is required for operation.

According to a first aspect, an optical fiber plug is provided. The optical fiber plug includes a plug body, a locking structure, and an unlocking structure. The locking structure is located on a side wall of the plug body and is for interlocking the plug body when inserted into an optical fiber adapter in an insertion direction with an elastic bolt of the optical fiber adapter, to lock up a relative position between the plug body and the optical fiber adapter. The unlocking structure is located on the side wall of the plug body, and is for releasing, when the plug body is detached from the optical fiber adapter in a direction opposite to the insertion direction, interlocking between the locking structure and the elastic bolt, so that the plug body and the optical fiber adapter can move relative to each other.

The optical fiber plug provided in this embodiment has at least the following effects:

When the optical fiber plug is inserted into the optical fiber adapter, the plug body is moved toward the optical fiber adapter in the insertion direction. As the plug body is moved, the plug body is inserted into the optical fiber adapter in place. In this case, the locking structure located on the side wall of the plug body interlocks with the elastic bolt of the optical fiber adapter, so that the relative position between the plug body and the optical fiber adapter locks up, that is, the optical fiber plug is securely inserted into the optical fiber adapter.

When the optical fiber plug is pulled out from the optical fiber adapter, the plug body is detached from the optical fiber adapter in a direction opposite to the insertion direction. In this case, the unlocking structure moves accordingly, to release interlocking between the locking structure and the elastic bolt. When interlocking is released, the plug body can naturally move relative to the optical fiber adapter, that is, the optical fiber plug is pulled out from the optical fiber adapter.

That is, a user can securely insert the optical fiber plug provided in this embodiment into the optical fiber adapter by only one action of inserting, and the user can also quickly pull the optical fiber plug out from the optical fiber adapter by only one action of pulling. In this way, users' operation is simplified, and a space required for operation by the user is further reduced, so that the optical fiber plug is applicable in a narrower space.

In an example embodiment, the locking structure includes an inner groove wall and a groove bottom that define a groove with a notch on one side. In addition, a shape of the groove and a bottom shape of the elastic bolt are sized to lock up the elastic bolt. That is, after the elastic bolt is engaged into the locking structure, the elastic bolt can be stopped by the inner groove wall, to lock up the relative position between the plug body and the optical fiber adapter. Corresponding to the locking structure, the unlocking structure is an inclined ramp and is located at the notch of the groove. For the locking structure, an extension direction of the unlocking structure is from the groove bottom to a groove opening of the locking structure. When the unlocking structure moves, the elastic bolt located in the locking structure is driven to retract toward the groove opening of the locking structure until the elastic bolt is guided and pushed to the groove opening of the locking structure, and finally the elastic bolt is moved out from the locking structure, to release interlocking between the locking structure and the elastic bolt, and release a relative movement limitation between the plug body and the optical fiber adapter.

In an example embodiment, the extension direction of the unlocking structure determines a direction for guiding and pushing the elastic bolt. If the extension direction of the unlocking structure is the same as a circumferential direction of the plug body, the elastic bolt is guided and pushed out of the groove opening of the unlocking structure in the circumferential direction of the plug body. In addition, because the locking structure and the unlocking structure are sequentially arranged in the extension direction, when the unlocking structure is required for unlocking, it can be ensured that the unlocking structure is in contact with the elastic bolt, so that the elastic bolt can be guided and pushed away from the groove opening of the locking structure, to release interlocking between the locking structure and the elastic bolt and enable the plug body to normally move relative to the optical fiber adapter.

In an example embodiment, the extension direction of the unlocking structure determines a direction for guiding and pushing the elastic bolt. If the extension direction of the unlocking structure is the same as the insertion direction of the plug body, the elastic bolt is guided and pushed out of the groove opening of the unlocking structure in an axial direction of the plug body. In addition, because the locking structure and the unlocking structure are sequentially arranged in the extension direction, when the unlocking structure is required for unlocking, it can be ensured that the unlocking structure is in contact with the elastic bolt, so that the elastic bolt can be guided and pushed away from the groove opening of the locking structure, to release interlocking between the locking structure and the elastic bolt and enable the plug body to normally move relative to the optical fiber adapter.

In an example embodiment, the plug body includes a shaft body and a sliding sleeve. The shaft body is a main part of the plug body and bears other components of the plug body and an optical fiber. The sliding sleeve is sleeved outside the shaft body and can rotate in a circumferential direction or move in an axial direction relative to the shaft body, to provide a moving basis for the unlocking structure. If the extension direction of the unlocking structure is the same as the circumferential direction of the plug body, correspondingly, the sliding sleeve rotates in the circumferential direction relative to the shaft body. If the extension direction of the unlocking structure is the same as the insertion direction of the plug body, correspondingly, the sliding sleeve moves in the circumferential direction relative to the shaft body. That is, because the locking structure and the unlocking structure are located on a side wall of the sliding sleeve, the locking structure and the unlocking structure can move with the sliding sleeve relative to the shaft body, to implement lockup by interlocking between the locking structure and the elastic bolt and implement unlocking by matching between the unlocking structure and the elastic bolt.

In an example embodiment, the locking structure is a through hole, that is, the locking structure penetrates through the side wall of the sliding sleeve. In addition, the locking structure may alternatively be a blind hole, that is, the locking structure does not penetrate through the side wall of the sliding sleeve. After the elastic bolt is engaged into the locking structure, the elastic bolt stops the sliding sleeve from moving in a direction opposite to the insertion direction, to prevent the plug body from falling away from the optical fiber adapter. The elastic bolt is limited in both of the two manners, and a difference lies only in that the elastic bolt extends into different depths relative to the sliding sleeve. It is easy to understand that, when the locking structure is the through hole, the elastic bolt extends into a larger depth, and when the locking structure is the blind hole, the elastic bolt extends into a smaller depth.

In an example embodiment, when the locking structure is the through hole, the unlocking structure includes a first side stage and a second side stage, and the first side stage and the second side stage extend out from the inner groove wall of the locking structure. The first side stage and the second side stage are sequentially arranged in an axial direction of the sliding sleeve, and the first side stage is connected to the second side stage to form the ramp of the unlocking structure, to guide the elastic bolt to be pushed out of the locking structure. In addition, a locking boss further extends out from an outer side wall of the shaft body, and the locking boss is located on one side of the second side stage that faces the shaft body, that is, the locking boss is located below the second side stage. In addition, a side wall of the locking boss is located at the notch of the groove of the locking structure, to stop the elastic bolt.

In an example embodiment, the plug body includes a driving sleeve, and the driving sleeve is sleeved outside the sliding sleeve and can move relative to the sliding sleeve. When the driving sleeve moves relative to the shaft body in a direction opposite to the insertion direction, the unlocking structure can be driven to rotate in the circumferential direction along an axis of the shaft body. In this way, a movement of the driving sleeve that is in the circumferential direction relative to the shaft body can be transformed into a movement of the unlocking structure that is in the circumferential direction relative to the shaft body. That is, what the user performs is still only one action of pulling, and the optical fiber plug can be quickly pulled out from the optical fiber adapter. An S-shaped driving groove is provided on an outer side wall of the sliding sleeve. The driving groove extends in the axial direction of the sliding sleeve in a length direction of the driving groove, and gradually bends in the circumferential direction of the sliding sleeve in a width direction of the driving groove. In addition, a driving protrusion is provided on an inner side wall of the driving sleeve, and the driving protrusion is inserted into the driving groove and can move relative to the driving groove. Because the driving sleeve can move relative to the shaft body in a direction opposite to the insertion direction, the driving protrusion can also move relative to the shaft body in a direction opposite to the insertion direction. When the driving protrusion moves, the driving protrusion is in contact with an inner side wall of the driving groove, to push the sliding sleeve to rotate relative to the shaft body, so that the unlocking structure rotates in the circumferential direction relative to the shaft body, to release interlocking between the locking structure and the elastic bolt.

In an example embodiment, a bending direction of the driving groove is the same as the extension direction of the unlocking structure, so that a rotation direction of the sliding sleeve is opposed to the extension direction of the unlocking structure, and the unlocking structure can guide and push the elastic bolt located in the locking structure out of the locking structure, to release interlocking between the locking structure and the elastic bolt.

In an example embodiment, the plug body includes a dustproof cap. Before the optical fiber plug is inserted into the optical fiber adapter, the dustproof cap can be sleeved outside the shaft body, to prevent dusts and impurities from entering the plug body and not to affect functionality of the plug body during working. Additionally, before the optical fiber plug needs to be inserted into the optical fiber adapter, the dustproof cap should be detached to facilitate normal insertion of the optical fiber plug.

In an example embodiment, the outer side wall of the shaft body is provided with a seal member, and the seal member is configured to be in sealed contact with an inner side wall of the dustproof cap. The seal member is configured to seal a gap between the outer side wall of the shaft body and the inner side wall of the dustproof cap, to prevent dusts and impurities from entering the optical fiber plug from the gap before the optical fiber plug is used, thereby ensuring reliability of the optical fiber plug. In addition, the seal member may be further configured to seal a gap between the outer side wall of the shaft body and an inner side wall of the optical fiber adapter, to prevent dusts and impurities from entering the optical fiber plug from the gap when the optical fiber plug is used, thereby further ensuring the reliability of the optical fiber plug.

In an example embodiment, a side wall of the shaft body is provided with a glue injection hole penetrating through the side wall of the shaft body. Before connecting an optical cable to the shaft body, the optical cable needs to be stripped to expose an optical fiber and a strength member of the optical cable, and then the optical fiber and the strength member are inserted into the shaft body together to complete the connection. After the connection is completed, glue is injected into the shaft body through the glue injection hole, so that a gap between the strength member and the inner side wall of the shaft body is filled with the glue, thereby improving stability of the connection between the optical cable and the shaft body.

In an example embodiment, the plug body further includes an insertion core component, and the insertion core component is connected to an end portion of the shaft body. The insertion core component can support the optical fiber obtained by stripping, to facilitate subsequent connection to another optical fiber in the optical fiber adapter and improve efficiency of optical signal coupling between optical fibers. In addition, an outer side wall of the insertion core component is provided with a first guide groove, and the first guide groove extends in the insertion direction. When the optical fiber plug is inserted to adapt to the optical fiber, because the first guide groove slidably fits with a guide protrusion on the inner side wall of the optical fiber adapter, the first guide groove can serve a guide function. In addition, because the optical fiber plug can be smoothly inserted into the optical fiber adapter only after the first guide groove is aligned with the optical fiber adapter, the first guide groove can further serve a foolproof function.

In an example embodiment, one end of the first guide groove that faces away from the shaft body is provided with a guide notch, and an opening of the guide notch gradually increases in size in the insertion direction, that is, the guide notch is in a shape of a horn mouth, so that the guide protrusion can be easily guided into the first guide groove.

In an example embodiment, the outer side wall of the shaft body is provided with a second guide groove, and the second guide groove extends in the insertion direction and is in communication with one end of the first guide groove that is close to the shaft body. When the plug body moves in the insertion direction, the guide protrusion gradually moves from the first guide groove into the second guide groove. In this way, relative rotation between the shaft body and the optical fiber adapter can be limited by matching between the guide protrusion and the second guide groove, thereby improving stability of insertion between the optical fiber plug and the optical fiber adapter.

According to a second aspect, an optical fiber connector is further provided. The optical fiber connector includes an optical fiber adapter and the optical fiber plug provided in the first aspect. The optical fiber adapter includes a butt-jointing sleeve into which the plug body is inserted. The optical fiber adapter further includes an elastic bolt connected to an inner side wall of the butt-jointing sleeve, and the elastic bolt protrudes from the inner side wall of the butt-jointing sleeve and is configured to interlock the locking structure and the unlocking structure together, to implement locking and unlocking.

The optical fiber connector provided in this embodiment has at least the following effects:

By matching between the optical fiber plug and the optical fiber adapter, direct insertion and removal from the optical fiber plug can be quickly implemented. This avoids complex operation, and the optical fiber connector is applicable in a narrower space.

In an example embodiment, the sliding sleeve can rotate in the circumferential direction relative to the shaft body, so that the unlocking structure can rotate with the sliding sleeve in the circumferential direction relative to the shaft body. In addition, because the extension direction of the unlocking structure is the same as the circumferential direction of the plug body, and the unlocking structure and the locking structure are sequentially arranged in the extension direction, when the unlocking structure rotates in the circumferential direction relative to the shaft body, it can be ensured that the unlocking structure is in contact with the elastic bolt, so that the elastic bolt can be guided and pushed away from the groove opening of the locking structure, to release interlocking between the locking structure and the elastic bolt and enable the plug body to normally move relative to the optical fiber adapter. Correspondingly, an end surface of the elastic bolt that is opposite to the plug body is provided with a second outer chamfer, the second outer chamfer bends and extends toward one side of the elastic bolt, and the second outer chamfer is configured to slidably fit with the unlocking structure. That is, when the unlocking structure moves in the circumferential direction of the plug body, the unlocking structure slides to fit with the second outer chamfer, so that the unlocking structure can smoothly push the elastic bolt, to avoid an obstruction between the unlocking structure and the elastic bolt.

In an example embodiment, the sliding sleeve can move in the axial direction relative to the shaft body, so that the unlocking structure can rotate with the sliding sleeve in the circumferential direction relative to the shaft body. In addition, because the extension direction of the unlocking structure is opposite to the insertion direction, and the unlocking structure and the locking structure are sequentially arranged in the extension direction, when the unlocking structure moves in the circumferential direction relative to the shaft body, it can be ensured that the unlocking structure is in contact with the elastic bolt, so that the elastic bolt can be guided and pushed away from the groove opening of the locking structure, to release interlocking between the locking structure and the elastic bolt and enable the plug body to normally move relative to the optical fiber adapter. Correspondingly, the end surface of the elastic bolt that is opposite to the plug body is provided with a first outer chamfer, the first outer chamfer bends and extends toward a plate surface of the elastic bolt, and the first outer chamfer is configured to slidably fit with the unlocking structure. That is, when the unlocking structure moves opposite to the insertion direction, the unlocking structure slides to fit with the first outer chamfer, so that the unlocking structure can smoothly push the elastic bolt to avoid an obstruction between the unlocking structure and the elastic bolt.

According to a third aspect, an optical fiber connection system is further provided. The optical fiber connection system includes a box body, an indoor optical fiber plug, and the optical fiber connector provided in the second aspect. The box body is configured to bear the optical fiber connector, so that the optical fiber adapter can be connected to a side wall of the box body. A part of the optical fiber adapter is located in the box body to facilitate insertion of the indoor optical fiber plug in the box body, and the other part of the optical fiber adapter is located outside the box body to facilitate insertion of the optical fiber plug provided in the first aspect.

The optical fiber connection system provided in this embodiment has at least the following effects:

Because the optical fiber connector can be inserted and removed directly in a narrow space, and the optical fiber plug can be quickly inserted into or pulled out from the optical fiber adapter, the optical fiber connection system accordingly may have the advantages of convenient operation and a small required space for operation. In addition, because the space required by the optical fiber connector for operation is small, more optical fiber connectors can be accommodated in a box body with a limited size.

DETAILED DESCRIPTION OF THE EMBODIMENTS

The terms are merely used to explain the embodiments and are not intended as limiting.

Figure 1:
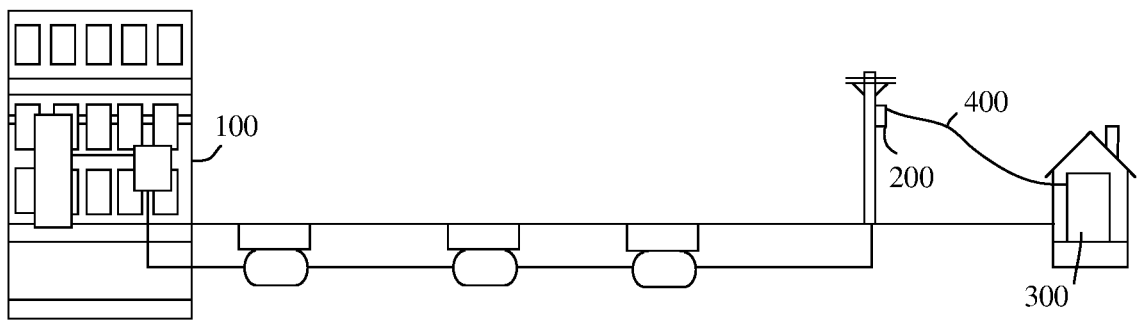
FIG. 1 is a schematic diagram of an operating connection of fiber to the home according to an embodiment.

FIG. 1 is a schematic diagram of an operating connection of fiber to the home (FTTH). Referring to FIG. 1, in a process of FTTH, optical fibers need to be routed through a central office (CO) 100, a connectorized fiber distribution point (CFDP) 200, and finally to a customer splicing point (CSP) 300. A connection between the CFDP and the CSP is implemented via a drop cable 400.

In a related technology, an optical fiber plug is arranged on each of two ends of the drop cable 400. The optical fiber plug at one end of the drop cable 400 is inserted into and fastened to an optical fiber adapter of the CFDP 200, and the optical fiber plug at the other end of the drop cable 400 is inserted into and fastened to the CSP 300. This implements the connection between the CFDP 200 and the CSP 300.

However, the optical fiber plug and the optical fiber adapter are fastened to each other by mating a locking cap on the optical fiber plug with a locking member on the optical fiber adapter. Therefore, after the optical fiber plug is inserted into the optical fiber adapter, the locking cap on the optical fiber plug further needs to be screwed to interlock the locking cap with the locking member together, so as to implement insertion and fastening between the optical fiber plug and the optical fiber adapter. Correspondingly, when the optical fiber plug is to be removed from the optical fiber adapter, the locking cap on the optical fiber plug needs to be unscrewed first, and then the optical fiber plug is pulled out from the optical fiber adapter. That is, the optical fiber plug is mounted by two actions of "inserting" and "screwing", and the optical fiber plug is detached by two actions of "unscrewing" and "pulling", resulting in complex operation. In addition, because the action of "screwing" requires a large operation space, at least a 33 mm gap may need to be ensured between two adjacent optical fiber plugs. As a result, the optical fiber plug is not applicable to a narrow space.

To resolve the foregoing problem, an embodiment may provide an optical fiber plug. The optical fiber plug can implement direct insertion and removal from the optical fiber plug on an optical fiber adapter, that is, the optical fiber plug is mounted on the optical fiber adapter by only one action of "inserting", and the optical fiber plug is detached from the optical fiber adapter by only one action of "pulling". It should be noted that, the foregoing is described by using FTTH as an example, and the optical fiber plug provided in this embodiment may be further applicable to another type of optical communication network in addition to FTTH. The following describes the optical fiber plug provided in this embodiment with reference to FIG. 2.

Figure 2:
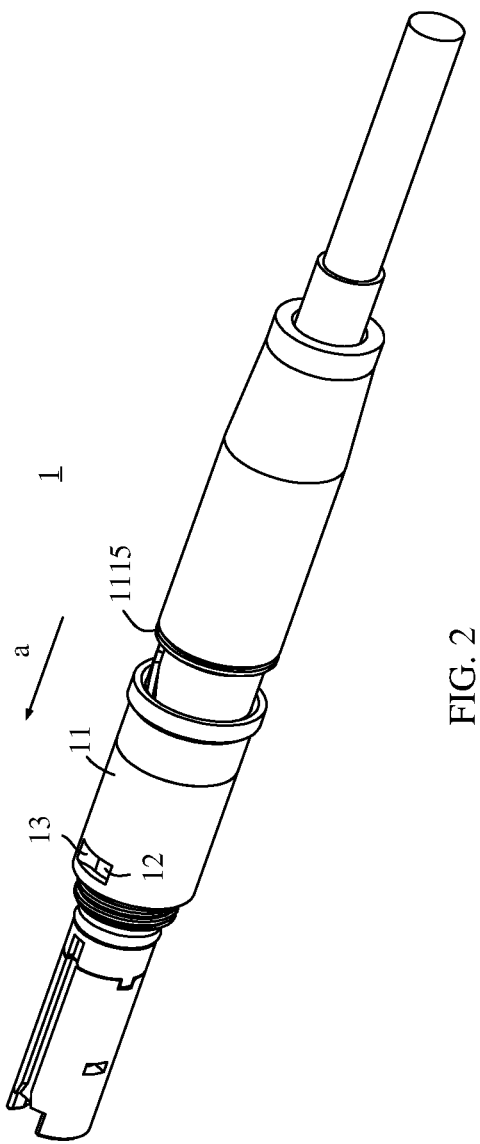
FIG. 2 is a schematic structural diagram of an optical fiber plug according to an embodiment.

FIG. 2 is a schematic structural diagram of the optical fiber plug. With reference to FIG. 2, the optical fiber plug includes a plug body 11, a locking structure 12, and an unlocking structure 13. The locking structure 12 and the unlocking structure 13 are located on a side wall of the plug body 11.

Figure 3:
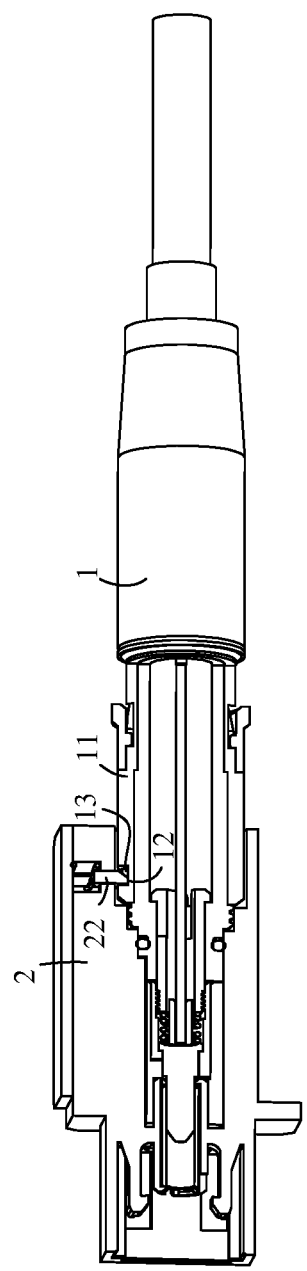
FIG. 3 is a sectional view of insertion of an optical fiber plug according to an embodiment.
Figure 7:
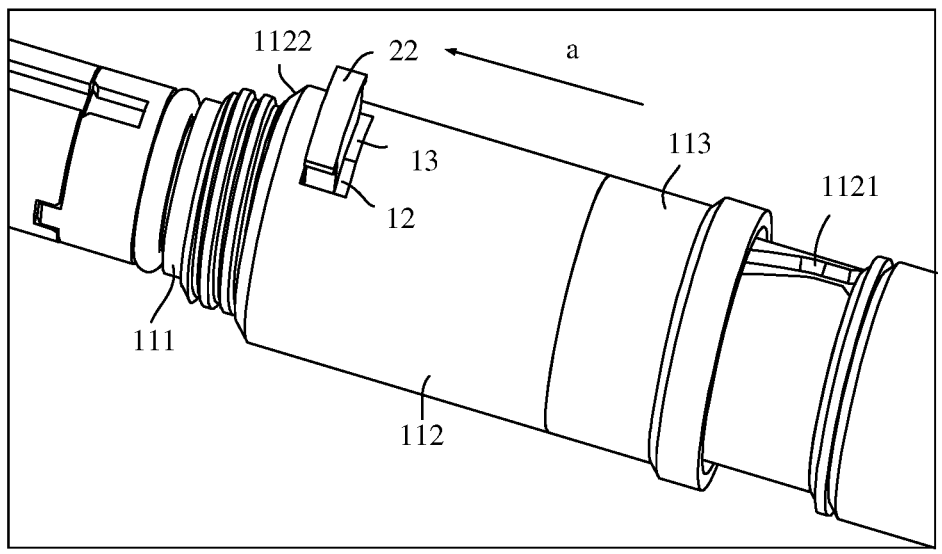
FIG. 7 is a schematic diagram of a state of interlocking between a locking structure and an elastic bolt according to an embodiment.

FIG. 3 is a sectional view of insertion of the optical fiber plug. FIG. 7 is a schematic diagram of a state of interlocking between the locking structure and an elastic bolt. With reference to FIG. 3 and FIG. 7, the locking structure 12 is for interlocking the plug body 11 when inserted into an optical fiber adapter 2 in an insertion direction with an elastic bolt 22 of the optical fiber adapter 2, to lock up a relative position between the plug body 11 and the optical fiber adapter 2. The insertion direction a is a direction in which the optical fiber plug moves toward the optical fiber adapter 2.

That is, when the optical fiber plug is inserted into the optical fiber adapter 2, the plug body 11 is moved toward the optical fiber adapter 2 in the insertion direction a. As the plug body 11 is moved, the plug body 11 is inserted into the optical fiber adapter 2 in place. In this case, the locking structure 12 located on the side wall of the plug body 11 interlocks with the elastic bolt 22 of the optical fiber adapter 2, so that the relative position between the plug body 11 and the optical fiber adapter 2 locks up, that is, the optical fiber plug is securely inserted into the optical fiber adapter 2. Therefore, it can be understood that users perform only one action of "inserting" in the entire process.

Figure 8:
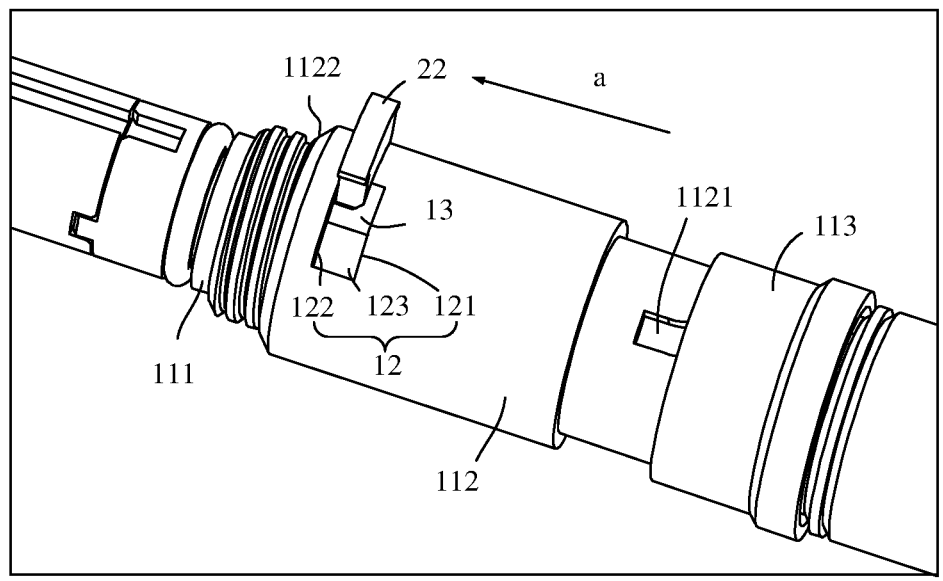
FIG. 8 is a schematic diagram of a state of unlocking between an unlocking structure and an elastic bolt according to an embodiment.

FIG. 8 is a schematic diagram of a state of unlocking between the unlocking structure and the elastic bolt. With reference to FIG. 8, correspondingly, the unlocking structure 13 is for releasing, when the plug body 11 is detached from the optical fiber adapter 2 in a direction opposite to the insertion direction, interlocking between the locking structure 12 and the elastic bolt 22.

That is, when the optical fiber plug is pulled out from the optical fiber adapter 2, the plug body 11 is detached from the optical fiber adapter 2 in a direction opposite to the insertion direction a. In this case, the unlocking structure 13 moves accordingly, to release interlocking between the locking structure 12 and the elastic bolt 22. When interlocking is released, the plug body 11 can naturally move relative to the optical fiber adapter 2, that is, the optical fiber plug is pulled out from the optical fiber adapter 2. Therefore, it can be understood that users perform only one action of "pulling" in the entire process.

According to the optical fiber plug provided in this embodiment, when the drop cable 400 is mounted on or detached from the optical fiber adapter 2, users' operation is very simple, and a space required for operation by users is small, so that two adjacent optical fiber plugs are spaced only about 13 mm apart. In addition, a diameter of the overall optical fiber plug is small and is only 11 mm. This helps improve arrangement density of optical fiber plugs, to arrange more optical fiber plugs in a limited space.

It can be understood from the foregoing that, the key to implementing direct insertion and removal from the optical fiber plug lies in the locking structure 12 and the unlocking structure 13. Therefore, the following continues to describe the locking structure 12 and the unlocking structure 13.

For ease of subsequent descriptions, in this embodiment, for insertion of the optical fiber plug, one end facing the optical fiber adapter is referred to as a head end, and the other end facing away from the optical fiber adapter 2 is referred to as a tail end. That is, a direction from the tail end to the head end of the optical fiber plug is the insertion direction a.

Figure 4:
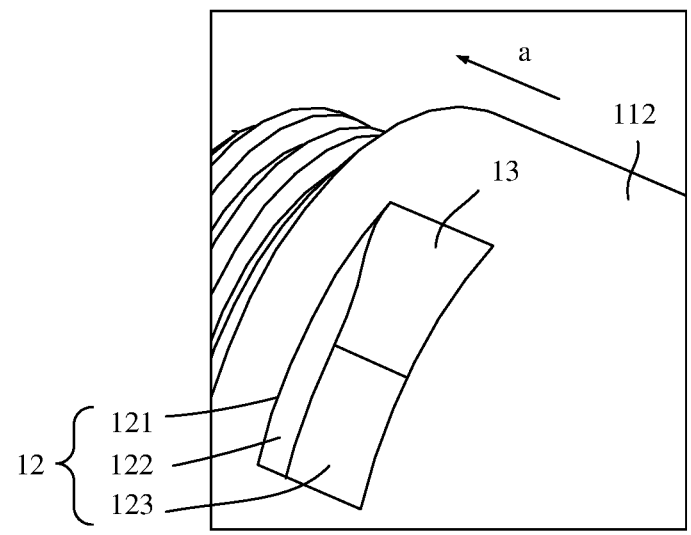
FIG. 4 is a schematic structural diagram of a locking structure and an unlocking structure according to an embodiment.
Figure 5:
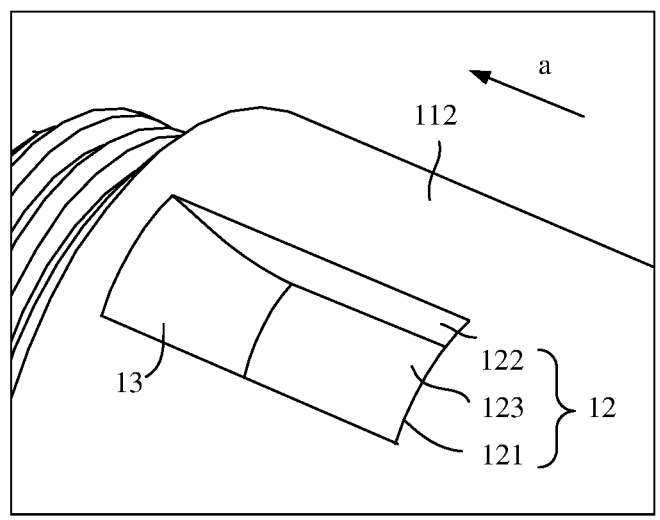
FIG. 5 is a schematic structural diagram of a locking structure and an unlocking structure according to an embodiment.

FIG. 4 and FIG. 5 are schematic structural diagrams of the locking structure and the unlocking structure. The locking structure 12 and the unlocking structure 13 shown in FIG. 4 and FIG. 5 are most basic implementations. The following describes basic principles of the locking structure 12 and the unlocking structure 13 with reference to FIG. 4 and FIG. 5.

In this embodiment, the locking structure 12 includes an inner groove wall 122 and a groove bottom 123. The inner groove wall 122 and the groove bottom 123 form a groove with a notch on one side, and a shape of the groove matches a bottom shape of the elastic bolt 22.

When the elastic bolt 22 is engaged into the locking structure 12, the elastic bolt 22 moves toward a position of the locking structure 12. When moving to a position corresponding to a groove opening 121 of the groove, the elastic bolt 22 is engaged into an internal space of the locking structure 12, that is, into the groove from the groove opening 121 under an action of elastic potential energy of the elastic bolt, and stops moving when abutting against the groove bottom (referring to FIG. 7). Subsequently, because the shape of the groove matches the bottom shape of the elastic bolt 22, the inner groove wall 122 can stop the elastic bolt 22, to prevent the elastic bolt 22 from falling away from the groove, to lock the optical fiber plug. Therefore, it can be understood that interlocking between the optical fiber plug and the optical fiber adapter 2 is essentially interlocking between the inner groove wall 122 of the groove and the elastic bolt 22 after the elastic bolt 22 is engaged into the groove.

Corresponding to the locking structure 12, the unlocking structure 13 is an inclined ramp, the unlocking structure 13 is located at the notch of the groove, and the unlocking structure 13 extends from the groove bottom of the locking structure 12 to the groove opening 121, to enable the elastic bolt 22 to retract from the groove opening 121.

After the elastic bolt 22 is engaged into the locking structure 12, the unlocking structure 13 moves synchronously with the plug body 11, and the elastic bolt 22 located in the locking structure 12 is guided and pushed to the groove opening 121 of the locking structure 12 (referring to FIG. 8), to further remove the locking structure 12 and further release interlocking between the locking structure 12 and the elastic bolt 22, to release a relative movement limitation between the plug body 11 and the optical fiber adapter 2. Therefore, it can be understood that unlocking between the optical fiber plug and the optical fiber adapter 2 is essentially pushing the elastic bolt 22 out of the groove opening 121 of the locking structure 12 in the extension direction by an incline of the ramp in the extension direction, to release interlocking between the inner side wall of the locking structure 12 and the elastic bolt 22.

It can be understood from the foregoing that, in the interlocking process, the elastic bolt 22 is engaged into the locking structure 12 in a direction opposite to the insertion direction a, while in the unlocking process, the unlocking structure 13 can push the elastic bolt 22 out in the circumferential direction of the plug body 11 (referring to FIG. 4), and can also push the elastic bolt 22 out in the axial direction of the plug body 11 (referring to FIG. 5). For the two directions of pushing the elastic bolt 22 out, the unlocking structure 13 has the following two extension manners.

First extension manner Referring to FIG. 4, the extension direction of the unlocking structure 13 is the same as the circumferential direction of the plug body 11, and the locking structure 12 and the unlocking structure 13 are sequentially arranged in the extension direction.

In this unlocking manner, when the unlocking structure 13 moves in the circumferential direction of the plug body 11 for unlocking, it can be ensured that the unlocking structure 13 is in contact with the elastic bolt 22, to push the elastic bolt 22 out from one side of the groove opening 121, to release interlocking between the locking structure 12 and the elastic bolt 22, so that the plug body 11 can move normally relative to the optical fiber adapter 2.

In the first extension manner, the unlocking structure 13 can be driven in the following manner.

Figure 6:
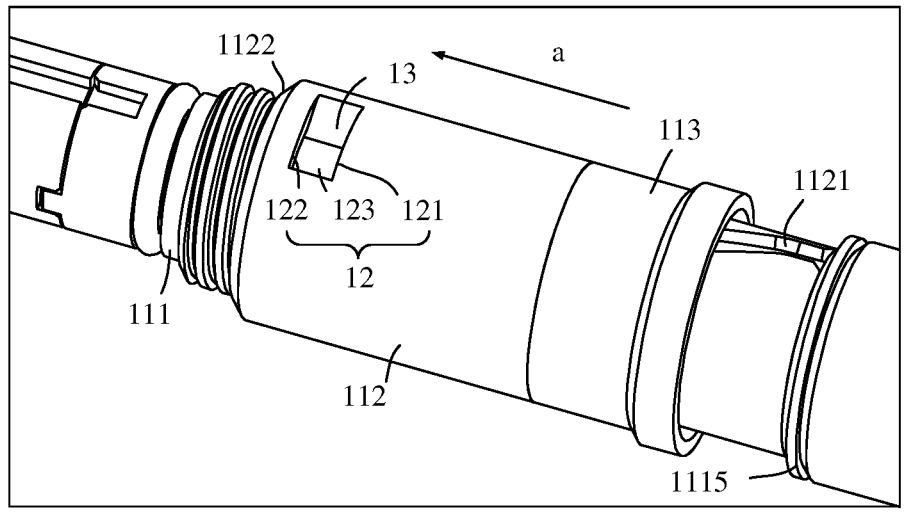
FIG. 6 is a schematic partial structural diagram of an optical fiber plug according to an embodiment.

FIG. 6 is a schematic partial structural diagram of the optical fiber plug. In this embodiment, the plug body 11 includes a shaft body 111 and a sliding sleeve 112. The sliding sleeve 112 is sleeved outside the shaft body 111 and rotates in the circumferential direction or moves in the axial direction relative to the shaft body 111. The locking structure 12 and the unlocking structure 13 are located on a side wall of the sliding sleeve 112.

The shaft body 111 is a main part of the plug body 11 and bears other components of the plug body 11 and an optical fiber. The sliding sleeve 112 can provide a moving basis for the locking structure 12 and the unlocking structure 13 that are located on the sliding sleeve. In this way, the locking structure 12 and the unlocking structure 13 can move with the sliding sleeve 112 relative to the shaft body 111, to implement lockup by interlocking between the locking structure 12 and the elastic bolt 22 and implement unlocking by matching between the unlocking structure 13 and the elastic bolt 22.

It is easy to understand that the sliding sleeve 112 can be driven by manually pinching the sliding sleeve 112. In some examples, an outer side wall of the sliding sleeve 112 is provided with an anti-scratch pattern, so that users can pinch the sliding sleeve 112 more conveniently.

In some examples, both the shaft body 111 and the sliding sleeve 112 are cylindrical mechanical components. A part of an outer side wall of the shaft body 111 is an outer circumferential wall, a part of an inner side wall of the sliding sleeve 112 is an inner circumferential wall. The outer circumferential wall of the shaft body 111 and the inner circumferential wall of the sliding sleeve 112 are in a clearance fit, so that the shaft body 111 and the sliding sleeve 112 can smoothly move relative to each other without unnecessary shakes.

Because the locking structure 12 is located on the side wall of the sliding sleeve 112, and the sliding sleeve 112 is sleeved outside the shaft body 111, it is necessary to ensure that the elastic bolt 22 can have plenty of elastic potential energy to engage into the locking structure 12, and no interference exists between another part of the plug body 11 and the elastic bolt 22. To achieve this objective, referring to FIG. 6, a guide slope 1122 is provided on the side wall of the sliding sleeve 112. The guide slope 1122 is located on one side of the locking structure 12 that faces the insertion direction a, and the guide slope 1122 inclines from the inner side wall of the sliding sleeve 112 to the outer side wall of the sliding sleeve 112 in a direction opposite to the insertion direction a. Further, to ensure that the guide slope 1122 can be in contact with the elastic bolt 22 ahead of the locking structure 12, the guide slope 1122 should be located closer to the head end of the sliding sleeve 112 than the locking structure 12. For example, the guide slope 1122 is located at an outer edge of the head end of the sliding sleeve 112. To further ensure that the elastic bolt 22 can normally engage into the locking structure 12, one end of the guide slope 1122 extends until being flush with the outer side wall of the sliding sleeve 112, that is, the elastic bolt 22 can be guided and pushed to the outer side wall of the sliding sleeve 112. A maximum height of the groove opening 121 of the locking structure 12 does not exceed that of the outer side wall of the sliding sleeve 112, to ensure that the elastic bolt 22 can normally engage into the locking structure 12.

Figure 9:
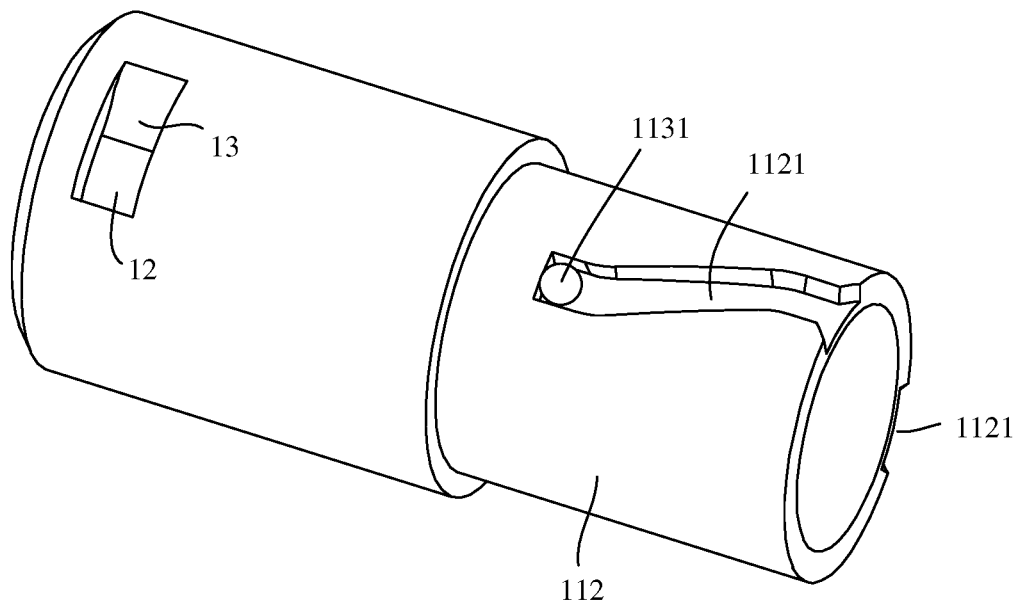
FIG. 9 is a schematic structural diagram of a sliding sleeve according to an embodiment.
Figure 10:
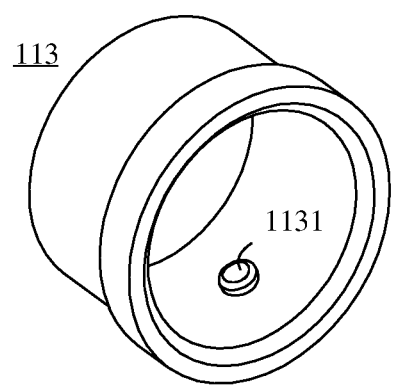
FIG. 10 is a schematic structural diagram of a driving sleeve according to an embodiment.

It is easy to understand that, in addition to directly pinching the sliding sleeve 112 to move, the embodiments may provide another manner of driving the sliding sleeve 112 to move. FIG. 9 is a schematic structural diagram of the sliding sleeve. To clearly show an assembly relationship between a driving sleeve 113 and the driving groove 1121, a partial structure of the driving sleeve 113 is reserved in FIG. 9. FIG. 10 is a schematic structural diagram of the driving sleeve. Referring to FIG. 9 and FIG. 10, a driving groove 1121 is provided on the outer side wall of the sliding sleeve 112, the driving groove 1121 extends in an axial direction of the sliding sleeve 112 and gradually bends in a circumferential direction of the sliding sleeve 112, the plug body 11 includes the driving sleeve 113, the driving sleeve 113 is movably sleeved outside the sliding sleeve 112, a driving protrusion 1131 is provided on the inner side wall of the driving sleeve 113, and the driving protrusion 1131 is movably inserted into the driving groove 1121.

When the driving sleeve 113 is sleeved on the sliding sleeve 112, a movement of the driving sleeve 113 that is in the circumferential direction relative to the shaft body 111 can be transformed into a movement of the unlocking structure 13 that is in the circumferential direction relative to the shaft body 111. That is, although a moving direction of the sliding sleeve 112 is rotation, what the user performs is still only one action of pulling. When the sliding sleeve 112 rotates for unlocking, the plug body 11 can be pulled out from the optical fiber adapter 2.

To avoid interference between the driving sleeve 113 and another component caused because the driving sleeve 113 excessively protrudes from the outer side wall of the sliding sleeve 112, in some examples, in a part of the driving sleeve 113 that moves relative to the sliding sleeve 112, a wall of the sliding sleeve 112 is thinner, so that an outer side wall of the driving sleeve 113 can be flush with the outer side wall of the sliding sleeve 112.

In addition, to limit a maximum distance of a movement of the driving sleeve 113 in a direction opposite to the insertion direction a, a limiting flange 1115 is provided on an outer wall of the shaft body 111 (referring to FIG. 6). As the driving sleeve 113 slides on the shaft body 111 in the direction opposite to the insertion direction a, the driving sleeve 113 abuts against an end surface of the limiting flange 1115, to serve a limiting function.

In this embodiment, the driving groove 1121 is an S-shaped extending groove body. Because the driving sleeve 113 can move relative to the shaft body 111 in the direction opposite to the insertion direction a, the driving protrusion 1131 located on the driving sleeve 113 accordingly moves relative to the shaft body 111 in the direction opposite to the insertion direction a. When the driving protrusion 1131 moves, the driving protrusion 1131 is in contact with an inner side wall of the driving groove 1121, to push the sliding sleeve 112 to rotate relative to the shaft body 111, so that the unlocking structure 13 rotates in the circumferential direction relative to the shaft body 111, to release interlocking between the locking structure 12 and the elastic bolt 22.

In some examples, the driving groove 1121 may alternatively be an inclined groove, that is, the driving groove 1121 extends in the axial direction of the sliding sleeve 112, and inclines in a radial direction of the sliding sleeve 112 relative to the axial direction of the sliding sleeve 112. In this way, the sliding sleeve 112 can rotate more greatly by a smaller axial displacement of the driving sleeve 113. A shape of the driving groove 1121 may be selected based on an actual requirement. This is not limited.

It should be noted that, a bending direction of the driving groove 1121 is the same as the extension direction of the unlocking structure 13. In this way, it can be ensured that the rotation direction of the sliding sleeve 112 is the same as the extension direction of the unlocking structure 13, so that the unlocking structure 13 can be in contact with the elastic bolt 22 while the sliding sleeve 112 rotates, to push the elastic bolt 22 for unlocking, thereby ensuring unlocking efficiency.

In some examples, two or more driving grooves 1121 spaced from each other are provided on the outer side wall of the sliding sleeve 112, the driving grooves 1121 have same extension directions and same bending directions, and connection lines between end portions of the driving grooves 1121 form a circle coaxial with the sliding sleeve 112. Correspondingly, a corresponding quantity of driving protrusions 1131 spaced from each other are provided on the inner side wall of the driving sleeve 113, connection lines between the driving protrusions 1131 form a circle coaxial with the driving sleeve 113, and the driving protrusions 1131 are movably inserted into the corresponding driving grooves 1121 respectively. When the driving sleeve 113 moves, the driving protrusions 1131 can simultaneously abut against the inner side walls of the respective corresponding driving grooves 1121, to jointly drive the sliding sleeve 112 to rotate smoothly.

In some examples, an elastic component (not shown) is arranged at the tail end of the driving sleeve 113. When the driving sleeve 113 moves relative to the shaft body 111 in a direction opposite to the insertion direction a, the elastic component is compressed. After the movement is completed, the driving sleeve can return to an original position under an action of the elastic component, to be ready for a next movement.

For the first extension manner, locking and unlocking processes are briefly described as follows:

The locking process: A user pinches the driving sleeve 113 to move in the insertion direction a, and the driving sleeve 113 drives the sliding sleeve 112 to move together. The guide slope 1122 is in contact with the elastic bolt 22 first. As the movement proceeds, the guide slope 1122 guides and pushes the elastic bolt 22 to move away from the outer side wall of the sliding sleeve 112 to compress the elastic bolt 22, and the elastic bolt 22 accumulates elastic potential energy. As the movement continues, the elastic bolt 22 crosses the guide slope 1122, moves onto the outer side wall of the sliding sleeve 112, and is in slidable contact with the outer side wall of the sliding sleeve 112. Subsequently, the elastic bolt 22 overcomes friction between the elastic bolt 22 and the outer side wall of the sliding sleeve 112 until moving to a position of the locking structure 12 and is engaged into the locking structure 12 under an action of elastic potential energy of the elastic bolt 22, to implement locking on the optical fiber plug by the elastic bolt 22 (referring to FIG. 7).

The unlocking process: The user pinches the sliding sleeve 112 to move opposite to the insertion direction a. With the matching between the driving protrusion 1131 and the driving groove 1121, the sliding sleeve 112 rotates in the circumferential direction relative to the shaft body 111. A part of the unlocking structure 13 that is located in the locking structure 12 is in contact with the elastic bolt 22 first. As the movement proceeds, the unlocking structure 13 guides and pushes the elastic bolt 22 to move away from the groove bottom of the locking structure 12 and compresses the elastic bolt 22 until the unlocking structure 13 is crossed, and the elastic bolt 22 is moved to one side of the groove opening 121 of the sliding sleeve 112 to be in contact with the outer side wall of the sliding sleeve 112 (referring to FIG. 8). In this case, the locking on the optical fiber plug by the elastic bolt 22 is released. Then, as the movement continues, the elastic bolt 22 overcomes the friction between the elastic bolt 22 and the outer side wall of the sliding sleeve 112 until falling away from the sliding sleeve 112 from the outer edge at which the guide slope 1122 is located, and the elastic bolt 22 returns to an original state, to wait for next insertion of the optical fiber plug.

Second extension manner: The extension direction of the unlocking structure 13 is the same as the insertion direction of the plug body 11, and the locking structure 12 and the unlocking structure 13 are sequentially arranged in the extension direction.

In this unlocking manner, when the unlocking structure 13 moves in the axial direction of the plug body 11 for unlocking, it can be ensured that the unlocking structure 13 is in contact with the elastic bolt 22, to push the elastic bolt 22 out from the head end of the groove opening 121, to release interlocking between the locking structure 12 and the elastic bolt 22, so that the plug body 11 can move normally relative to the optical fiber adapter 2.

In the second extension manner, the unlocking structure 13 may alternatively be driven by an axial movement of the sliding sleeve 112. However, because there is no need to convert circumferential rotation into an axial movement, interlocking between the driving sleeve 113 and a component such as the driving groove 1121 is not required, and the sliding sleeve 112 can be directly pinched to move in the axial direction.

Figure 11:
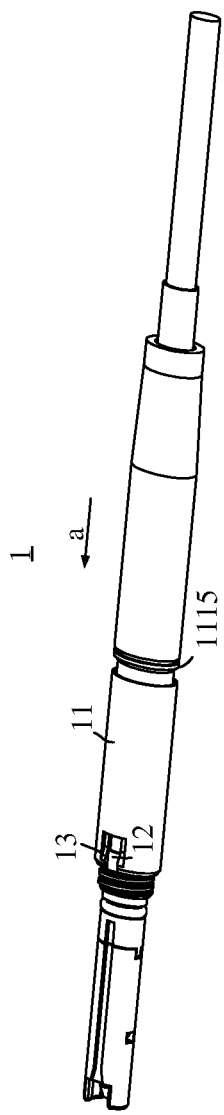
FIG. 11 is a schematic structural diagram of an optical fiber plug according to an embodiment.

In addition, to limit a maximum distance of a movement of the sliding sleeve 112 in a direction opposite to the insertion direction a, a limiting flange 1115 is provided on an outer wall of the shaft body 111 (referring to FIG. 11). As the sliding sleeve 112 slides on the shaft body 111 in a direction opposite to the insertion direction a, the sliding sleeve 112 abuts against an end surface of the limiting flange 1115, to serve a limiting function.

Figure 13:
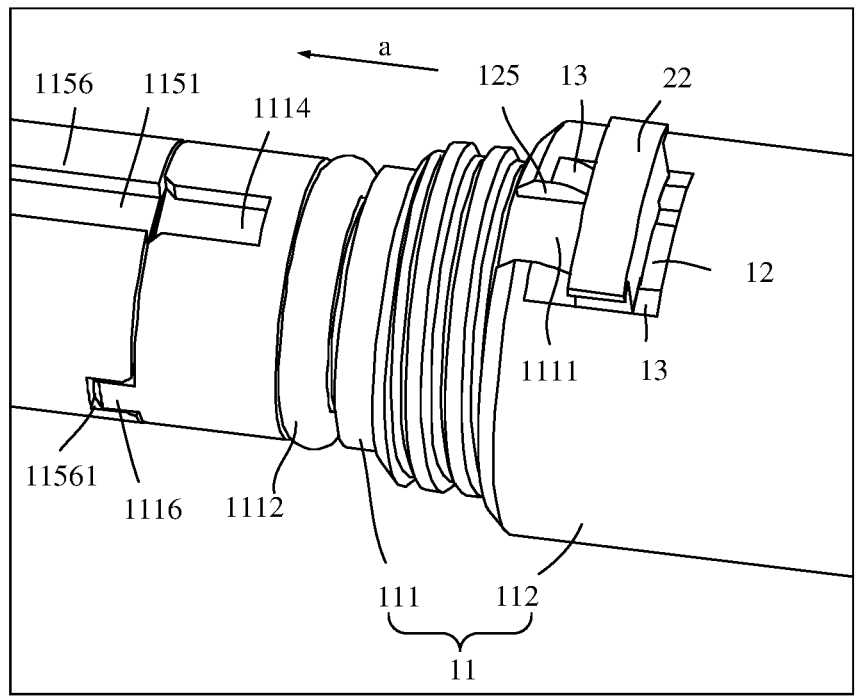
FIG. 13 is a schematic diagram of a state of interlocking between a locking structure and an elastic bolt according to an embodiment.

For the second extension manner, locking and unlocking processes are briefly described as follows:

The locking process: A user pinches the sliding sleeve 112 to move in the insertion direction a. The guide slope 1122 is in contact with the elastic bolt 22 first. As the movement proceeds, the guide slope 1122 guides and pushes the elastic bolt 22 to move away from the outer side wall of the sliding sleeve 112 to compress the elastic bolt 22, and the elastic bolt 22 accumulates elastic potential energy. As the movement continues, the elastic bolt 22 crosses the guide slope 1122, moves onto the outer side wall of the sliding sleeve 112, and is in slidable contact with the outer side wall of the sliding sleeve 112. Subsequently, the elastic bolt 22 overcomes friction between the elastic bolt 22 and the outer side wall of the sliding sleeve 112 until moving to a position of the locking structure 12 and is engaged into the locking structure 12 under an action of elastic potential energy of the elastic bolt 22, to implement locking on the optical fiber plug by the elastic bolt 22 (referring to FIG. 13).

Figure 14:
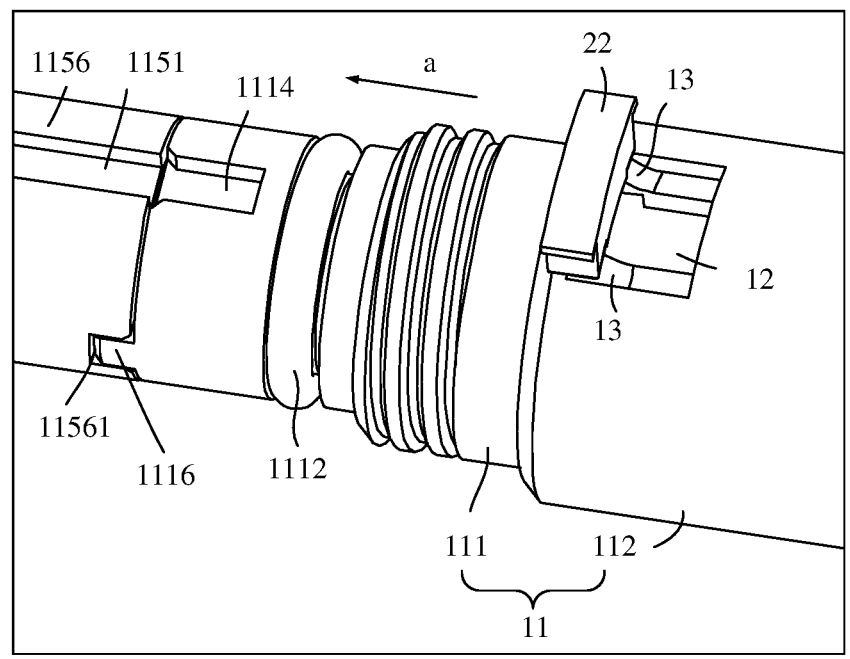
FIG. 14 is a schematic diagram of a state of unlocking between an unlocking structure and an elastic bolt according to an embodiment.

The unlocking process: The user pinches the sliding sleeve 112 to move opposite to the insertion direction a, so that the sliding sleeve 112 moves in the axial direction relative to the shaft body 111. A part of the unlocking structure 13 that is located in the locking structure 12 is in contact with the elastic bolt 22 first. As the movement proceeds, the unlocking structure 13 guides and pushes the elastic bolt 22 to move away from the groove bottom of the locking structure 12 and compresses the elastic bolt 22 until the unlocking structure 13 is crossed, and the elastic bolt 22 is moved to the head end of the groove opening 121 of the sliding sleeve 112 to be in contact with the outer side wall of the sliding sleeve 112 (referring to FIG. 14). In this case, the locking on the optical fiber plug by the elastic bolt 22 is released. Then, as the movement continues, the elastic bolt 22 overcomes the friction between the elastic bolt 22 and the outer side wall of the sliding sleeve 112 until falling away from the sliding sleeve 112 from the outer edge at which the guide slope 1122 is located, and the elastic bolt 22 returns to an original state, to wait for next insertion of the optical fiber plug.

The two extension manners of the unlocking structure 13 are actually basically in the same principle that the unlocking structure 13 is used as an inclined ramp to push the elastic bolt 22 out of the locking structure 12. A difference lies in that the unlocking structure 13 moves in different directions relative to the plug body 11, that is, the unlocking structure 13 pushes the elastic bolt 22 in different directions. The two unlocking manners can be selected based on an actual requirement. This is not limited.

Figure 12:
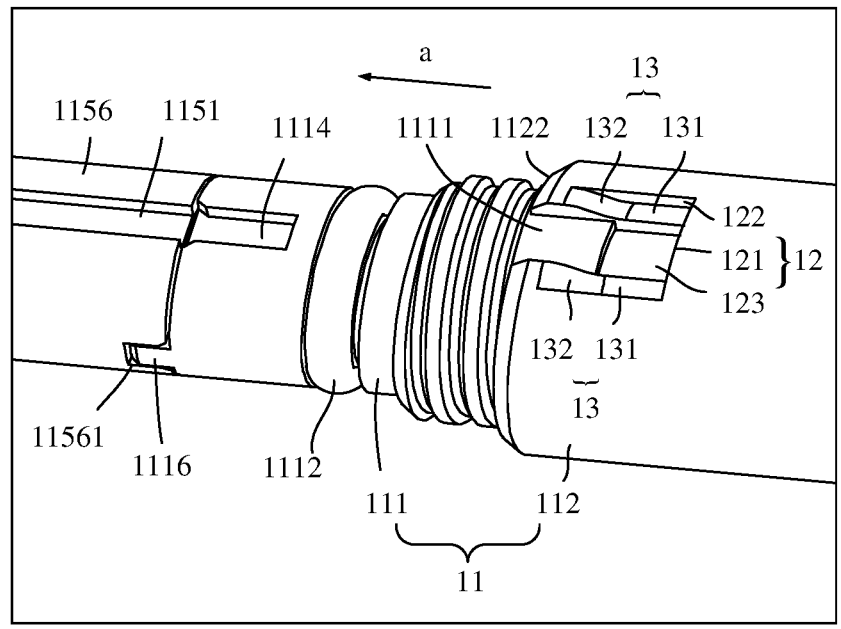
FIG. 12 is a schematic partial structural diagram of an optical fiber plug according to an embodiment.

The following describes two types of locking structures 12 with reference to FIG. 6 and FIG. 12 respectively.

First type of locking structure 12: Referring to FIG. 6, the locking structure 12 is a blind hole.

In the foregoing implementation, the locking structure 12 is entirely located on the sliding sleeve 112, so that the elastic bolt 22 directly locks the sliding sleeve 112, thereby implementing overall locking on the optical fiber plug.

For the first type of locking structure 12, the unlocking structure 13 can be directly arranged at an edge of the locking structure 12. In this way, composition of the unlocking structure 13 is very simple, production costs are reduced, and better unlocking reliability is ensured.

Second type of locking structure 12: Referring to FIG. 12, the locking structure 12 is a through hole.

The elastic bolt 22 can be limited in both of the two manners, and a difference lies only in that the elastic bolt 22 extends into different depths relative to the sliding sleeve 112. It is easy to understand that, when the locking structure 12 is the through hole, the elastic bolt 22 extends into a larger depth, and when the locking structure 12 is the blind hole, the elastic bolt 22 extends into a smaller depth.

In addition, when the locking structure 12 is the through hole, because the locking structure 12 penetrates through the side wall of the sliding sleeve 112, the elastic bolt 22 can also extend straight into the shaft body 111, and a groove is correspondingly provided on the outer side wall of the shaft body 111 to accommodate the elastic bolt 22. In this way, the shaft body 111 and the sliding sleeve 112 can be locked simultaneously, thereby further improving locking stability.

In addition, when the locking structure 12 is the through hole, the shaft body 111 and the sliding sleeve 112 can be further used together to form a groove. For this case, refer to FIG. 12.

When the locking structure 12 is the through hole, the unlocking structure 13 includes a first side stage 131 and a second side stage 132, the first side stage 131 and the second side stage 132 are both located on the inner groove wall 122 in the axial direction of the sliding sleeve 112, the first side stage 131 is connected to the second side stage 132 to form the ramp, a locking boss 1111 extends from an outer side wall of the shaft body 111, the locking boss 1111 is located on one side of the second side stage 132 that faces the shaft body 111, and a side wall of the locking boss 1111 is located at the notch of the groove.

In the foregoing implementation, the first side stage 131 and the second side stage 132 form the unlocking structure 13 together. Because both the first side stage 131 and the second side stage 132 are located in the groove, it can be ensured that the unlocking structure 13 is located in the locking structure 12, so that the unlocking structure 13 can better drive the elastic bolt 22 located in the locking structure 12, and reliability of the unlocking structure 13 is ensured.

In some examples, two opposite inner groove walls 122 are each provided with one second side stage 132, the two second side stages 132 are respectively located on two sides in the axial direction of the sliding sleeve 112, and extension directions of the two second side stages 132 are the same and symmetrical. In this way, the elastic bolt 22 can be more stably guided and pushed, and stable unlocking of the unlocking structure 13 is ensured.

For the first side stage 131, when the first side stage 131 can move with the second side stage 132, and after the elastic bolt 22 is engaged into the locking structure 12, the first side stage 131 can support the elastic bolt 22, to avoid unnecessary shakes of the elastic bolt 22.

In this embodiment, one end of the first side stage 131 extends opposed to the extension direction of the unlocking structure 13, so that after falling into the locking structure 12, the elastic bolt 22 can move along with the first side stage 131, thereby implementing limiting guide on the elastic bolt 22.

Corresponding to the two second side stages 132, the two opposite inner groove walls 122 are each provided with one first side stage 131, the two first side stages 131 are respectively located on the two sides in the axial direction of the sliding sleeve 112, and extension directions of the two first side stages 131 are the same and symmetrical. In this way, the elastic bolt 22 can be supported more stably, and stable accommodation on the elastic bolt 22 by the locking structure 12 is ensured.

The locking boss 1111 is configured to stop the elastic bolt 22 penetrating through the sliding sleeve 112. Because the locking boss 1111 is located on the shaft body 111, the elastic bolt 22 can directly lock the shaft body 111 by the locking boss 1111, to implement the overall locking on the optical fiber plug.

In some examples, a part of the locking structure 12 on the sliding sleeve 112 is a square notch, and the locking boss 1111 is located at an opening of the square notch, so that the locking boss 1111 and the square notch can jointly form the groove of the locking structure 12.

That is, the locking structure 12 may be formed by both the shaft body 111 and the sliding sleeve 112, to stop the shaft body 111 by the elastic bolt 22, or may be independently located on the sliding sleeve 112, to stop the sliding sleeve 112 by the elastic bolt 22, and both the two manners can prevent the plug body 11 from falling away from the optical fiber adapter 2.

It should be noted that, although descriptions are made with reference to FIG. 6 when the locking structure 12 is the blind hole, and FIG. 6 shows the first extension manner of the unlocking structure 13, this is merely used as an example, and does not require that when the locking structure 12 is the blind hole, only the first extension manner of the unlocking structure 13 is applicable. Similarly, although descriptions are made with reference to FIG. 12 when the locking structure 12 is the through hole, and FIG. 12 shows the second extension manner of the unlocking structure 13, this is merely used as an example, and does not require that when the locking structure 12 is the through hole, only the second extension manner of the unlocking structure 13 is applicable. Mutual combination and adaptation are performed based on an actual requirement. This is not limited.

The following describes other components of the optical fiber plug.

Figure 15:
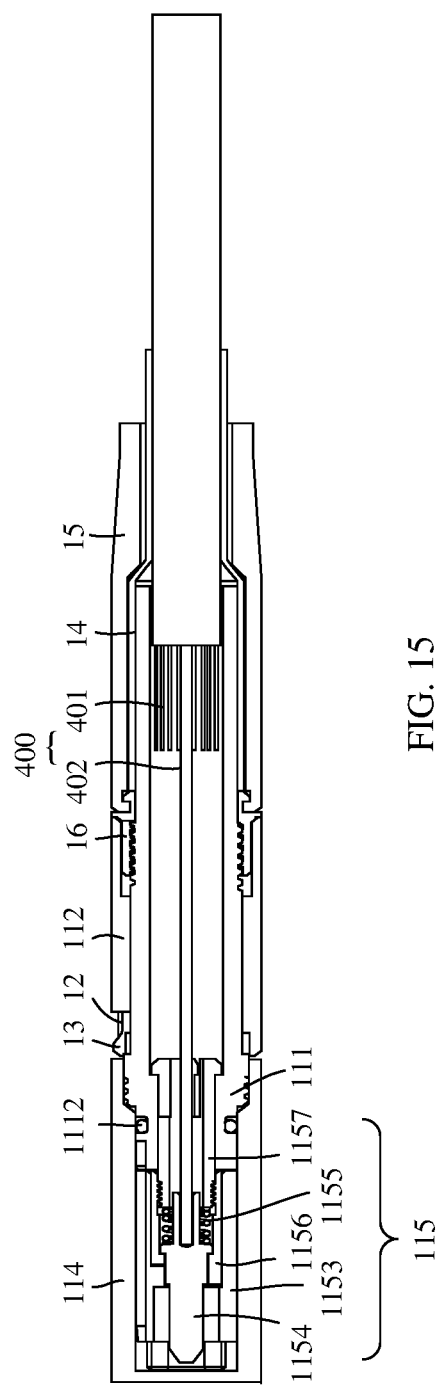
FIG. 15 is a sectional view of an optical fiber plug according to an embodiment.

As dusts and other impurities affect normal work of the optical fiber plug, the optical fiber plug needs to be provided with dust-proof protection. FIG. 15 is a sectional view of a non-inserted state of the optical fiber plug. Referring to FIG. 15, in this embodiment, the plug body 11 further includes a dustproof cap 114 sleeved outside the shaft body 111. Before the optical fiber plug is inserted into the optical fiber adapter 2, the dustproof cap 114 is sleeved outside the shaft body 111, to prevent dusts and impurities from entering the plug body 11 to affect functionality of the plug body 11 during working. Additionally, before the optical fiber plug needs to be inserted into the optical fiber adapter 2, the dustproof cap 114 should be detached to facilitate normal insertion of the optical fiber plug.

In some examples, an inner side wall of the dustproof cap 114 and the outer side wall of the shaft body 111 are in a thread fit.

The threaded connection between the dustproof cap 114 and the shaft body 111 can implement quick and stable mounting of the dustproof cap 114, and also implement quick detachment of the dustproof cap 114, thereby improving convenience of using the optical fiber plug.

n some examples, the dustproof cap 114 and the outer side wall of the shaft body 111 are in an interference fit, to omit inner threads on the inner side wall of the dustproof cap 114 and outer threads on the outer side wall of the shaft body 111, so that a structure of the optical fiber plug is simpler. This is not limited.

To further improve a dust-proof capability of the optical fiber plug, the outer side wall of the shaft body 111 is provided with a seal member 1112, and the seal member 1112 is configured to be in sealed contact with the inner side wall of the dustproof cap 114.

In the foregoing implementation, the seal member 1112 is configured to seal a gap between the outer side wall of the shaft body 111 and the inner side wall of the dustproof cap 114, to prevent dusts and impurities from entering the optical fiber plug from the gap before the optical fiber plug is used, thereby ensuring reliability of the optical fiber plug. In addition, the seal member 1112 may be further configured to seal a gap between the outer side wall of the shaft body 111 and an inner side wall of the optical fiber adapter 2, to prevent dust and impurities from entering the optical fiber plug from the gap when the optical fiber plug is used, thereby further ensuring the reliability of the optical fiber plug.

For example, the seal member 1112 is a seal ring, and the seal member 1112 is sleeved on the outer side wall of the shaft body 111, to seal the optical fiber plug in a simple manner.

It can be understood from the foregoing that the dustproof cap 114 is used to implement dust-proof protection for the optical fiber plug before being used. In addition, before being used, the optical fiber plug further needs to be connected to the optical cable 400. Still referring to FIG. 15, when the optical cable 400 is connected, the optical cable 400 is inserted from the tail end of the shaft body 111, then a strength member 401 in the optical cable 400 is reserved at a tail portion of the shaft body 111, and the optical fiber 402 penetrates through the entire shaft body 111 and extends out from the head end of the shaft body 111. To securely fasten the optical cable 400 to the tail end of the shaft body 111, in this embodiment, the optical fiber plug further includes a heat-shrink protective sleeve 14 and a tail sleeve 15. A part of the heat-shrink protective sleeve is sleeved on the shaft body 111, the other part of the heat-shrink protective sleeve is sleeved on the optical cable 400, and the heat-shrink protective sleeve 14 tightly wraps the optical cable 400 and the shaft body 111 by a heating operation. The tail sleeve 15 is sleeved on the heat-shrink protective sleeve 14, a head end of the tail sleeve 15 is assembled with the shaft body 111 in a threaded connection by a threaded base 16, and an inner side wall of the tail sleeve 15 is clamped on an outer side wall of the threaded base 16.

That is, the heat-shrink protective sleeve 14 is configured to bind the optical cable 400 and the shaft body 111 together by using heat shrinkage performance of the heat-shrink protective sleeve 14. The tail sleeve 15 is configured to cover the heat-shrink protective sleeve 14, to protect the heat-shrink protective sleeve 14, to avoid a case that the heat-shrink protective sleeve 14 cannot securely bind the optical cable 400 and the shaft body 111 due to damages.

Figure 16:
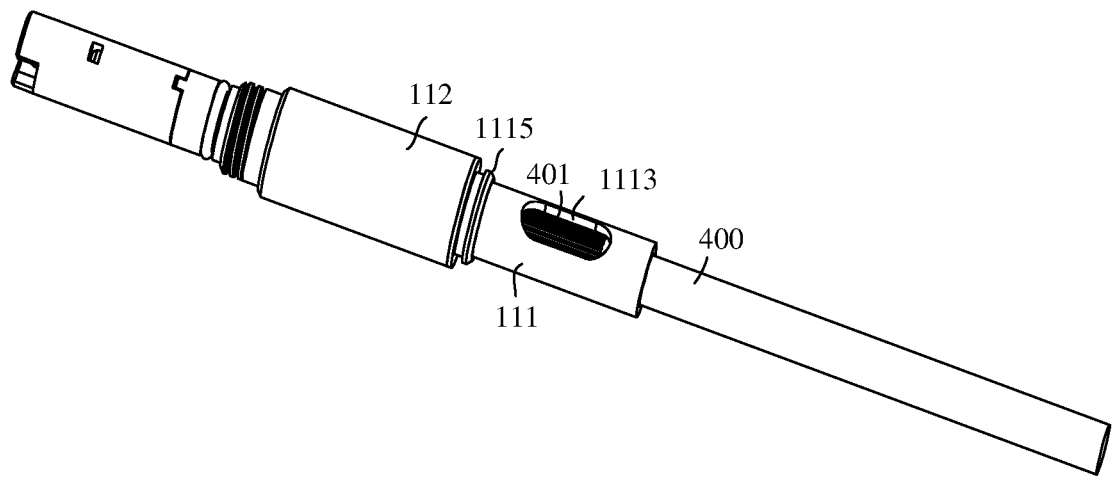
FIG. 16 is a schematic structural diagram of a glue injection hole according to an embodiment.

To further improve stability of the connection between the optical cable 400 and the optical fiber plug, before the heat-shrink protective sleeve 14 is sleeved, glue can be further injected into the shaft body 111 through a glue injection hole 1113. FIG. 16 is a schematic structural diagram of the glue injection hole 1113. To more clearly show the glue injection hole 1113, the heat-shrink protective sleeve 14 and the tail sleeve 15 are hidden in FIG. 16. With reference to FIG. 16, the glue injection hole 1113 is located on the side wall of the shaft body 111 and penetrates through the side wall of the shaft body 111. In this way, the strength member and the inner side wall of the shaft body 111 can be glued together by using the glue injected from the glue injection hole 1113, thereby improving stability of the connection between the optical fiber plug and the optical cable 400.

In some examples, the glue injection hole 1113 is in a shape of a circle, an ellipse, a square, or the like. This is not limited.

Figure 17:
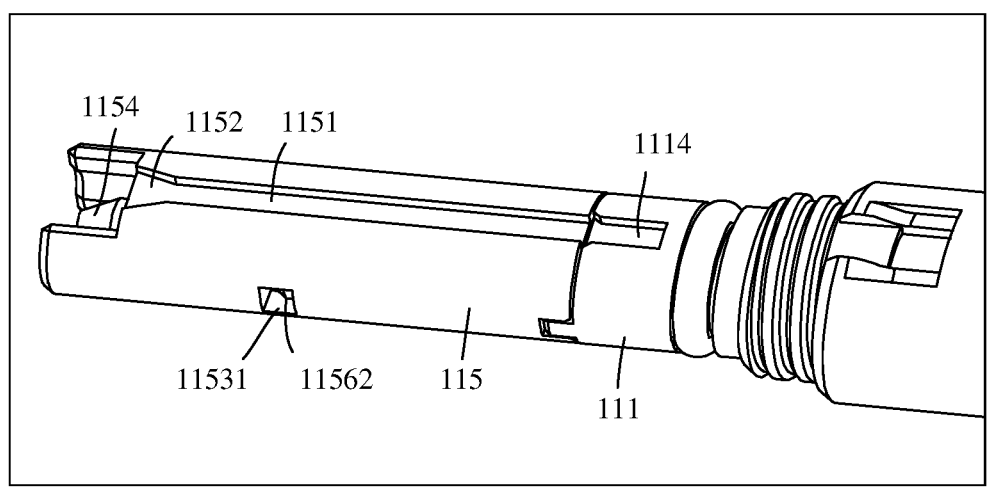
FIG. 17 is a schematic structural diagram of an insertion core component according to an embodiment.

FIG. 17 is a schematic structural diagram of an insertion core component 115. Referring to FIG. 17, in this embodiment, the plug body 11 further includes the insertion core component 115, the insertion core component 115 is connected to an end portion of the shaft body 111, an outer side wall of the insertion core component 115 is provided with a first guide groove 1151, and the first guide groove 1151 extends in the insertion direction a.

As mentioned above, when the optical cable 400 is connected, the optical cable 400 is inserted from the tail end of the shaft body 111, then the strength member in the optical cable 400 is reserved at the tail portion of the shaft body 111, and the optical fiber penetrates through the entire shaft body 111 and extends out from the head end of the shaft body 111. Therefore, the insertion core component 115 is used to support the optical fiber extending out, to facilitate subsequent connection to another optical fiber in the optical fiber adapter 2 and improve efficiency of optical signal coupling between optical fibers. In addition, when the optical fiber plug is inserted to adapt to the optical fiber, because the first guide groove 1151 slidably fits with a guide protrusion on the inner side wall of the optical fiber adapter 2, the first guide groove 1151 can serve a guide function. In addition, because the optical fiber plug can be smoothly inserted into the optical fiber adapter 2 only after the first guide groove 1151 is aligned with the optical fiber adapter 2, the first guide groove 1151 can further serve a foolproof function.

In some examples, one end of the first guide groove 1151 that faces away from the shaft body 111 is provided with a guide notch 1152, and an opening of the guide notch 1152 gradually increases in size in the insertion direction a, that is, the guide notch 1152 is in a shape of a horn mouth, so that the guide protrusion can be easily guided into the first guide groove 1151.

For example, an inner side wall of the guide notch 1152 may be a slope inclined relative to the first guide groove 1151 or may be a curve bending relative to the first guide groove 1151, as long as it can be ensured that the opening of the guide notch 1152 gradually increases in size in the insertion direction a and the guide protrusion can be guided into the first guide groove 1151. This is not limited.

In some examples, the outer side wall of the shaft body 111 is provided with a second guide groove 1114, and the second guide groove 1114 extends in the insertion direction a and is in communication with one end of the first guide groove 1151 that is close to the shaft body 111.

When the plug body 11 moves in the insertion direction a, the guide protrusion gradually moves from the first guide groove 1151 into the second guide groove 1114. In this way, relative rotation between the shaft body 111 and the optical fiber adapter 2 can be limited by matching between the guide protrusion and the second guide groove 1114, thereby improving stability of insertion between the optical fiber plug and the optical fiber adapter 2. That is, after the optical fiber plug is inserted into the optical fiber adapter 2 in place, the guide protrusion is located in the second guide groove 1114, to ensure that the shaft body 111 inserted into the optical fiber adapter 2 does not rotate.

Figure 18:
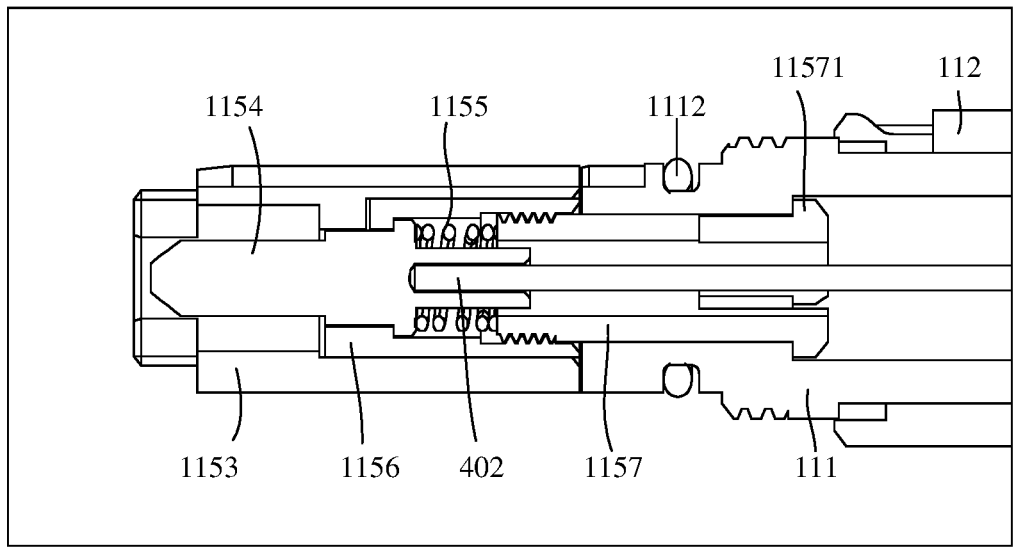
FIG. 18 is a sectional view of an insertion core component according to an embodiment.

FIG. 18 is a sectional view of the insertion core component 115. Referring to FIG. 18, in this embodiment, the insertion core component 115 includes a protective frame 1153, an insertion core 1154, an insertion core spring 1155, an insertion core jacket 1156, and a spring base 1157.

Figure 19:
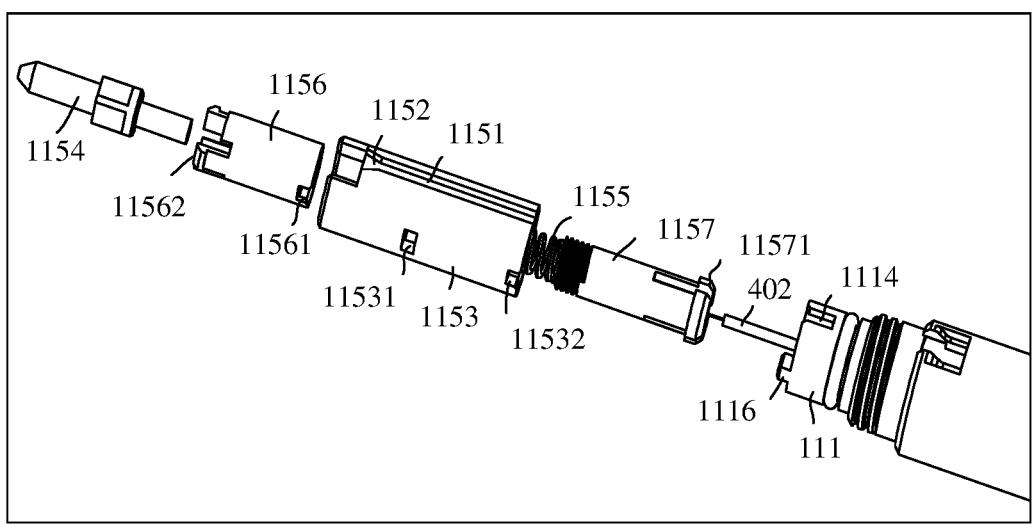
FIG. 19 is an exploded view of an insertion core component according to an embodiment.

FIG. 19 is an exploded view of the insertion core component 115. The following describes an assembly relationship of the insertion core component 115 with reference to FIG. 18 and FIG. 19.

A tail end of the spring base 1157 is inserted into the head end of the shaft body 111, and the tail end of the spring base 1157 is provided with a first buckle 11571. The first buckle 11571 is clamped on the inner side wall of the shaft body 111, to limit a displacement of the spring base 1157 relative to the shaft body 111 in the insertion direction a. A head end of the spring base 1157 extends out of the shaft body 111 and is inserted into a tail end of the insertion core jacket 1156. The spring base 1157 and the insertion core jacket 1156 are in a threaded connection, so that the spring base 1157 and the insertion core jacket 1156 are integrally connected. The tail end of the insertion core jacket 1156 abuts against the head end of the shaft body 111, thereby limiting a displacement of the spring base 1157 relative to the shaft body 111 in a direction opposite to the insertion direction a, so that the insertion core jacket 1156, the spring base 1157, and the shaft body 111 are integrated. In addition, the tail end of the insertion core jacket 1156 is provided with a first anti-rotation depression 11561, and the head end of the shaft body 111 is provided with a matching anti-rotation protrusion 1116. When the tail end of the insertion core jacket 1156 abuts against the head end of the shaft body 111, the anti-rotation protrusion 1116 is inserted into the first anti-rotation depression 11561, to avoid a failure of the threaded connection between the insertion core jacket 1156 and the spring base 1157 caused by rotation of the insertion core jacket 1156.

A head end of the insertion core jacket 1156 is provided with a second buckle 11562, a clamping hole 11531 penetrates through a side wall of the protective frame 1153, the insertion core jacket 1156 is inserted into the protective frame 1153, and the second buckle 11562 is clamped in the clamping hole 11531, so that the protective frame 1153, the insertion core jacket 1156, the spring base 1157, and the shaft body 111 are integrated. In addition, a tail end of the protective frame 1153 is provided with a second anti-rotation depression 11532, and the anti-rotation protrusion 1116 is also inserted into the second anti-rotation depression 11532, to avoid rotation of the protective frame 1153.

A tail end of the insertion core 1154 is inserted into the head end of the insertion core jacket 1156, and the insertion core spring 1155 is located in the insertion core jacket 1156 and is compressed between the tail end of the insertion core 1154 and the head end of the spring base 1157, to push the insertion core 1154 out in the insertion direction a, to ensure efficiency of optical signal coupling of the insertion core 1154. The optical fiber sequentially passes through the spring base 1157, the insertion core jacket 1156, and the insertion core 1154, and finally extends out from a head end of the insertion core 1154, to wait to be connected. The head end of the insertion core 1154 is located in the protective frame 1153, so that the insertion core 1154 is protected by the protective frame 1153.

Figure 20:
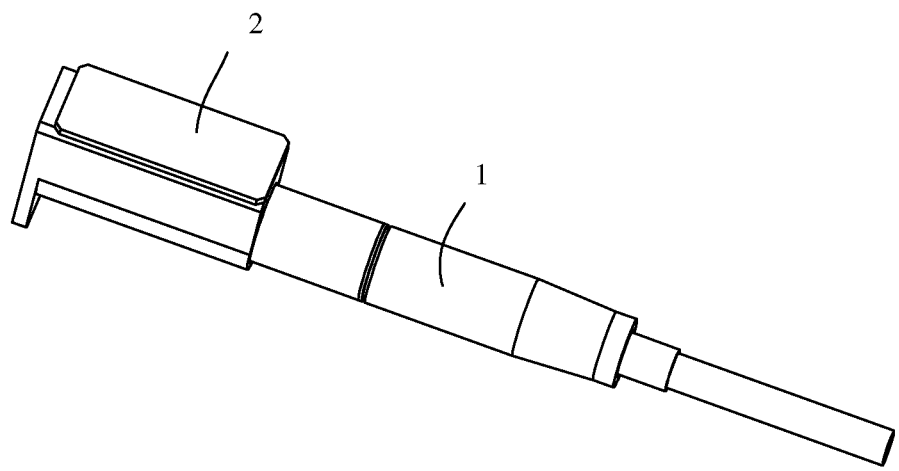
FIG. 20 is a schematic structural diagram of an optical fiber connector according to an embodiment.

FIG. 20 is a schematic structural diagram of an optical fiber connector according to an embodiment. Referring to FIG. 20, the optical fiber connector includes an optical fiber adapter 2 and the optical fiber plug 1 shown in FIG. 2 or FIG. 11.

Figure 21:
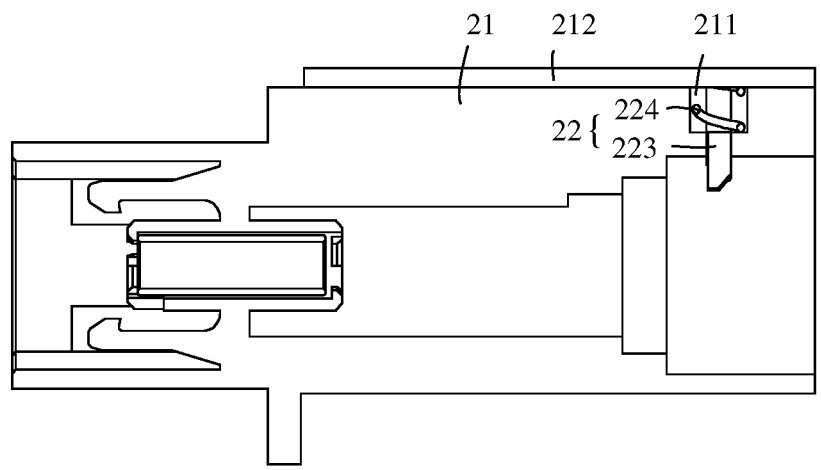
FIG. 21 is a sectional view of an optical fiber adapter according to an embodiment.
Figure 22:
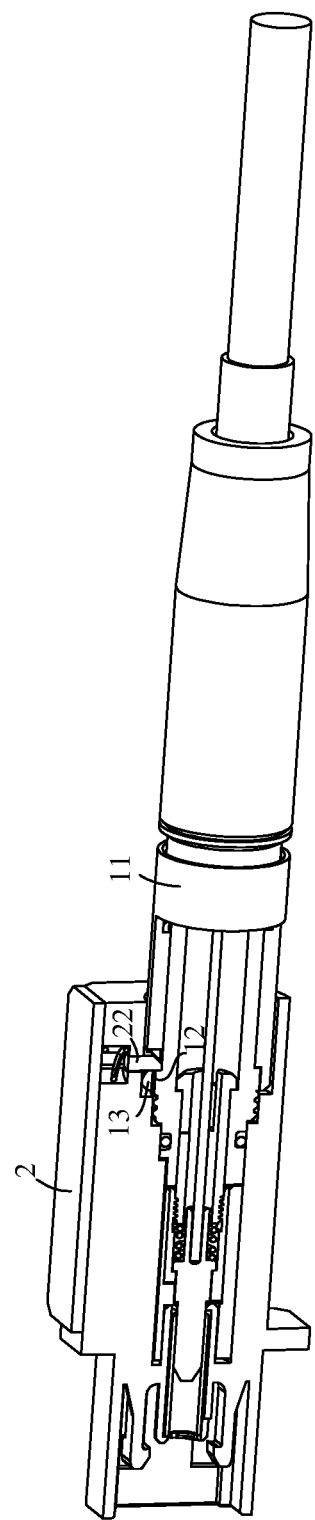
FIG. 22 is a sectional view of insertion of an optical fiber plug according to an embodiment.

FIG. 21 is a sectional view of the optical fiber adapter 2. With reference to FIG. 21, the optical fiber adapter 2 includes a butt-jointing sleeve 21 and an elastic bolt 22. The elastic bolt 22 is connected to an inner side wall of the butt-jointing sleeve 21, and the elastic bolt 22 protrudes from the inner side wall of the butt-jointing sleeve 21 and is configured to match the locking structure 12 and the unlocking structure 13 (referring to FIG. 22).

The optical fiber connector provided in this embodiment has at least the following effects:

By matching between the optical fiber plug 1 and the optical fiber adapter 2, direct insertion and removal from the optical fiber plug 1 can be quickly implemented. This avoids complex operations and enables the optical fiber connector to be used in a narrower space.

Figure 23:
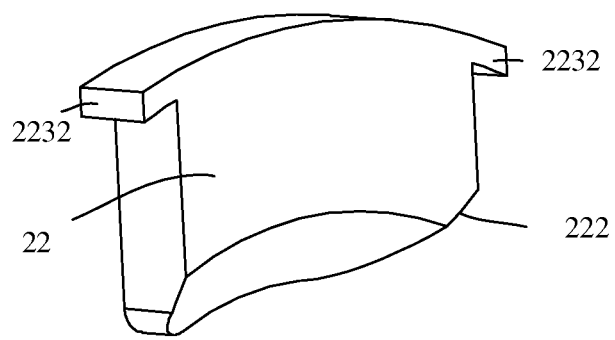
FIG. 23 is a schematic structural diagram of an elastic bolt according to an embodiment.

FIG. 23 is a schematic structural diagram of the elastic bolt 22 when the optical fiber plug adopts the first unlocking manner. With reference to FIG. 23, an end surface of the elastic bolt 22 that is opposite to the plug body 11 is provided with a second outer chamfer 222, the second outer chamfer 222 bends and extends toward one side of the elastic bolt 22, and the second outer chamfer 222 is configured to slidably fit with the unlocking structure.

When the unlocking structure 13 moves in the circumferential direction of the plug body 11, the unlocking structure 13 slides to match the second outer chamfer 222, so that the unlocking structure 13 can smoothly push the elastic bolt 22, and an obstruction between the unlocking structure 13 and the elastic bolt 22 can be avoided.

Figure 24:
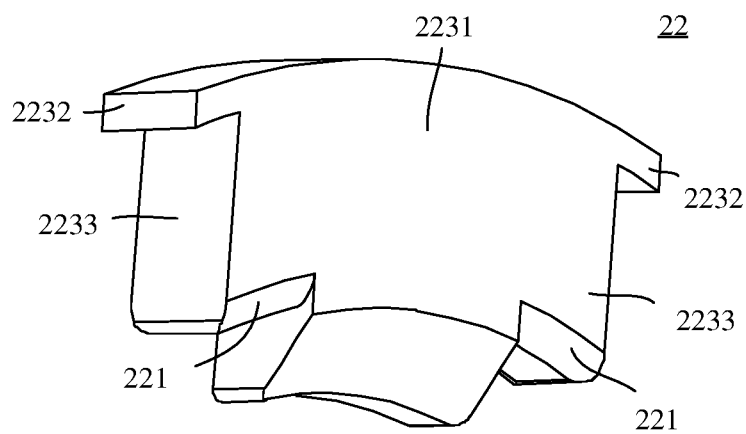
FIG. 24 is a schematic structural diagram of an elastic bolt according to an embodiment.

FIG. 24 is a schematic structural diagram of the elastic bolt 22 when the optical fiber plug adopts the second unlocking manner. With reference to FIG. 24, the end surface of the elastic bolt 22 that is opposite to the plug body 11 is provided with a first outer chamfer 221, the first outer chamfer 221 bends and extends toward a plate surface of the elastic bolt 22, and the first outer chamfer 221 is configured to slidably fit with the unlocking structure.

When the unlocking structure 13 moves opposite to the insertion direction a, the unlocking structure 13 slides to match the first outer chamfer 221, so that the unlocking structure 13 can smoothly push the elastic bolt 22, and an obstruction between the unlocking structure 13 and the elastic bolt 22 can be avoided.

Still referring to FIG. 21, a mounting hole 211 penetrates through a side wall of the butt-jointing sleeve 21, an outer side wall of the butt-jointing sleeve 21 is provided with a pressure plate 212, the elastic bolt 22 includes a bolt structure 223 and an elastic component 224, a part of the bolt structure 223 is movably inserted into the mounting hole 211, and the elastic component 224 is located in the mounting hole 211 and compressed between the bolt structure 223 and the pressure plate 212. In this way, the elastic bolt 22 can be quickly mounted by disassembling the pressure plate 212.

Still referring to FIG. 24, in some examples, the bolt structure 223 includes a locking plate 2231 and limiting lugs 2232. The locking plate 2231 is perpendicular to a length direction of the butt-jointing sleeve 21, the limiting lugs 2232 are connected to the locking plate 2231 and are located on two sides in a moving direction of the locking plate 2231, an inner side wall at an opening of the mounting hole 211 is provided with a limiting protrusion, and the limiting lug 2232 is opposite to the limiting protrusion, so that the bolt structure 223 can be prevented from falling away from the mounting hole 211, and reliability of the optical fiber adapter 2 is improved.

In some examples, the bolt structure 223 further includes support plates 2233. The support plates 2233 are connected to the locking plate 2231 and are located on two sides of the locking plate 2231. Two plate surfaces of the support plate 2233 are flush with two plate surfaces of the locking plate 2231. The support plate 2233 is configured to match the second side stage 132, so that the second side stage 132 can be used to support the support plate 2233, thereby improving stability of insertion of the bolt structure 223 in the locking structure 12.

Figure 25:
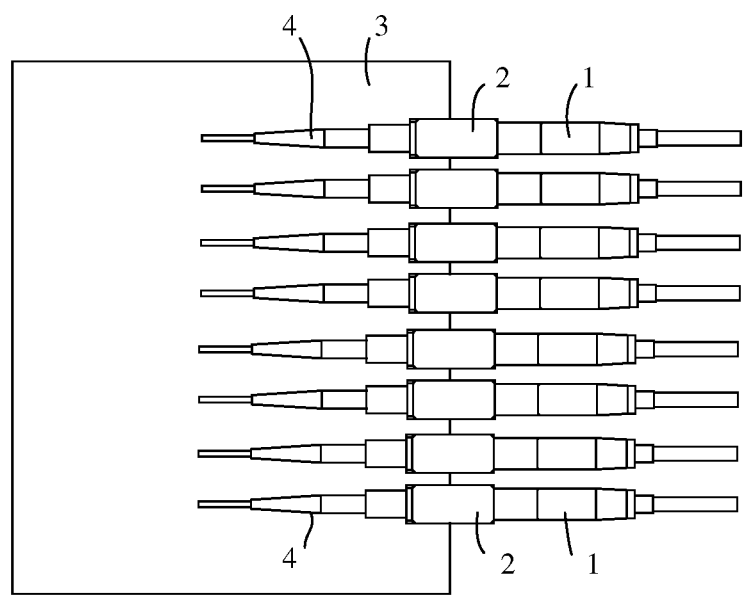
FIG. 25 is a schematic structural diagram of an optical fiber connection system according to an embodiment.

FIG. 25 is a schematic structural diagram of an optical fiber connection system according to an embodiment. Referring to FIG. 25, the optical fiber connection system includes a box body 3, an indoor optical fiber plug 4, and the optical fiber connector shown in FIG. 20. The optical fiber adapter 2 is connected to a side wall of the box body 3, and has a part located in the box body 3. The indoor optical fiber plug 4 is located in the box body 3 and is inserted into the optical fiber adapter 2.

In this embodiment, the optical fiber connection system includes a plurality of optical fiber connectors, the optical fiber connectors are arranged abreast, and a spacing between the optical fiber connectors may be about 13 mm.

The optical fiber connection system provided in this embodiment has at least the following effects:

Because the optical fiber connector can be inserted in line and pulled out in line in a narrow space, more optical fiber connectors can be arranged in the optical fiber connection system with a limited size, thereby improving applicability of the optical fiber connection system.

In some examples, the box body 3 includes a bottom housing and an upper cover, the bottom housing is hinged with the upper cover, and the optical fiber connector is connected to a side wall of the bottom housing, so that the upper cover serves a dust-proof function for the optical fiber connector.

In the foregoing implementations, the objectives, solutions, and beneficial effects are further described in detail. It should be understood that the foregoing descriptions are merely implementations, but are not intended as limiting. Any modification, equivalent replacement, improvement, or the like shall fall within the scope of the embodiments.

What is claimed is:

1. An optical fiber plug, comprising:
   a plug body;
   a locking structure; and
   an unlocking structure, wherein
   the plug body further comprises a shaft body and a sliding sleeve, the sliding sleeve is sleeved outside the shaft body and configured to rotate in a circumferential direction or move in an axial direction relative to the shaft body, and the locking structure and the unlocking structure are located on a side wall of the sliding sleeve;
   the locking structure is located on a side wall of the plug body, and is configured to interlock with the plug body when inserted into an optical fiber adapter in an insertion direction with an elastic bolt of the optical fiber adapter and to lock up a relative position between the plug body and the optical fiber adapter; and
   the unlocking structure is located on the side wall of the plug body, and is configured to release, when the plug body is detached from the optical fiber adapter in a direction opposite to the insertion direction, interlocking between the locking structure and the elastic bolt.

2. The optical fiber plug according to claim 1, wherein the locking structure further comprises:
   an inner groove wall and a groove bottom, the inner groove wall and the groove bottom form a groove with a notch on one side, and a shape of the groove matches a bottom shape of the elastic bolt; and
   the unlocking structure is an inclined ramp located at the notch of the groove and configured to extend from the groove bottom of the locking structure to a groove opening, to enable the elastic bolt to retract from the groove opening.

3. The optical fiber plug according to claim 1, wherein an extension direction of the unlocking structure is the same as a circumferential direction of the plug body and the locking structure and the unlocking structure are sequentially arranged in the extension direction.

4. The optical fiber plug according to claim 1, wherein an extension direction of the unlocking structure is the same as the insertion direction of the plug body and the locking structure and the unlocking structure are sequentially arranged in the extension direction.

5. The optical fiber plug according to claim 1, wherein the locking structure is either a blind hole or a through hole.

6. The optical fiber plug according to claim 5, wherein, when the locking structure is the through hole, the unlocking structure further comprises:
   a first side stage and a second side stage, the first side stage and the second side stage are both located on the inner groove wall of the locking structure in an axial direction of the sliding sleeve, the first side stage is configured to be connected to the second side stage to form the ramp of the unlocking structure, a locking boss extends from an outer side wall of the shaft body and is located on one side of the second side stage that faces the shaft body, and a side wall of the locking boss is located at the notch of the groove of the locking structure.

7. The optical fiber plug according to claim 1, wherein a driving groove is provided on an outer side wall of the sliding sleeve and is configured to extend in an axial direction of the sliding sleeve and gradually bend in a circumferential direction of the sliding sleeve, the plug body further comprises:
   a driving sleeve configured to be movably sleeved outside the sliding sleeve, a driving protrusion is provided on an inner side wall of the driving sleeve and configured to be movably inserted into the driving groove.

8. The optical fiber plug according to claim 7, wherein a bending direction of the driving groove is the same as the extension direction of the unlocking structure.

9. The optical fiber plug according to claim 1, wherein the plug body further comprises:
A dustproof cap sleeved outside the shaft body.

10. The optical fiber plug according to claim 9, wherein the outer side wall of the shaft body is provided with a seal member configured to be in sealed contact with an inner side wall of the dustproof cap.

11. The optical fiber plug according to claim 1, wherein a side wall of the shaft body is provided with a glue injection hole configured to penetrate through the side wall of the shaft body.

12. The optical fiber plug according to claim 1, wherein the plug body further comprises:
an insertion core component connected to an end portion of the shaft body, an outer side wall of the insertion core component is provided with a first guide groove, and the first guide groove extends in the insertion direction.

13. The optical fiber plug according to claim 12, wherein one end of the first guide groove that faces away from the shaft body is provided with a guide notch, and an opening of the guide notch gradually increases in size in the insertion direction.

14. The optical fiber plug according to claim 13, wherein the outer side wall of the shaft body is provided with a second guide groove configured to extend in the insertion direction in communication with one end of the first guide groove that is close to the shaft body.

15. An optical fiber connector, comprising:
an optical fiber adapter; and
an optical fiber plug, wherein
the optical fiber plug comprises:
a plug body;
a locking structure; and
an unlocking structure, wherein
the plug body further comprises a shaft body and a sliding sleeve, the sliding sleeve is sleeved outside the shaft body and configured to rotate in a circumferential direction or move in an axial direction relative to the shaft body, and the locking structure and the unlocking structure are located on a side wall of the sliding sleeve;

the locking structure is located on a side wall of the plug body, and is configured to interlock with the plug body when inserted into an optical fiber adapter in an insertion direction with an elastic bolt of the optical fiber adapter, to lock up a relative position between the plug body and the optical fiber adapter; and the unlocking structure is located on the side wall of the plug body, and is configured to release, when the plug body is detached from the optical fiber adapter in a direction opposite to the insertion direction, interlocking between the locking structure and the elastic bolt; and
the optical fiber adapter comprises:
a butt-jointing sleeve and an elastic bolt; wherein the elastic bolt is connected to an inner side wall of the butt-jointing sleeve, and the elastic bolt is configured to protrude from the inner side wall of the butt-jointing sleeve, and is configured to match the locking structure and the unlocking structure.

16. The optical fiber connector according to claim 15, wherein an extension direction of the unlocking structure is the same as a circumferential direction of the plug body,
the locking structure and the unlocking structure are sequentially arranged in the extension direction,
an end surface of the elastic bolt that is opposite to the plug body is provided with a second outer chamfer configured to bend and extend toward one side of the elastic bolt, and the second outer chamfer is configured to slidably fit with the unlocking structure.

17. The optical fiber connector according to claim 16, wherein an extension direction of the unlocking structure is the same as the insertion direction of the plug body,
the locking structure and the unlocking structure are sequentially arranged in the extension direction,
the end surface of the elastic bolt that is opposite to the plug body is provided with a first outer chamfer configured to bend and extend toward a plate surface of the elastic bolt, and the first outer chamfer is configured to slidably fit with the unlocking structure.

18. An optical fiber connection system, comprising a box body, an indoor optical fiber plug, and the optical fiber connector according to claim 15, wherein
the optical fiber adapter is connected to a side wall of the box body, and has a part located in the box body; and
the indoor optical fiber plug is located in the box body and is inserted into the optical fiber adapter.

* * * * *